United States Patent
Bardi et al.

(10) Patent No.: US 11,820,610 B2
(45) Date of Patent: *Nov. 21, 2023

(54) SORTING APPARATUS FOR SORTING AND STACKING TILES

(71) Applicant: SACMI TECH S.P.A., Mola (IT)

(72) Inventors: Maurizio Bardi, Formigine (IT); Roberto Stefani, Scandiano (IT); Federico Corazza, Bologna (IT); Mario Aldo Gianolio Lopez, Corticella (IT); Paolo Uguzzoni, Spezzano Di Fiorano (IT)

(73) Assignee: SACMI TECH S.P.A., Imola (IT)

( * ) Notice: Subject to any disclaimer, the term of this patent is extended or adjusted under 35 U.S.C. 154(b) by 15 days.

This patent is subject to a terminal disclaimer.

(21) Appl. No.: 17/609,926

(22) PCT Filed: May 14, 2020

(86) PCT No.: PCT/IB2020/054555
§ 371 (c)(1),
(2) Date: Nov. 9, 2021

(87) PCT Pub. No.: WO2020/230067
PCT Pub. Date: Nov. 19, 2020

(65) Prior Publication Data
US 2022/0219921 A1 Jul. 14, 2022

(30) Foreign Application Priority Data
May 14, 2019 (IT) .................. 102019000006832

(51) Int. Cl.
*B65G 57/04* (2006.01)
*B65G 49/08* (2006.01)

(52) U.S. Cl.
CPC ............. *B65G 57/04* (2013.01); *B65G 49/08* (2013.01)

(58) Field of Classification Search
CPC ....... B23P 19/007; B23Q 7/02; B65G 47/914; B65G 29/00; B65G 47/918; B65G 57/04; B65G 49/08; Y10S 901/08
(Continued)

(56) References Cited

U.S. PATENT DOCUMENTS

| 5,100,284 A * | 3/1992 | Boisseau ................ B25J 9/0084 414/793 |
| 6,334,523 B1 * | 1/2002 | Fukunaga ............. B23P 19/007 198/619 |
| 2022/0242681 A1 * | 8/2022 | Bardi ................... B65G 47/914 |

FOREIGN PATENT DOCUMENTS

| DE | 102012223173 A1 | 6/2014 |
| EP | 30800149 A1 | 10/2016 |

(Continued)

*Primary Examiner* — Gregory W Adams
(74) *Attorney, Agent, or Firm* — R. Neil Sudol; Henry D. Coleman

(57) ABSTRACT

An apparatus for sorting and stacking slab-shaped elements (2), for example tiles, has an inlet line; a plurality of suction gripping units; a plurality of rotating arms which each bear a suction gripping unit; a plurality of seats for receiving the slab-shaped elements, forming stacks of slab-shaped elements; and a support crown which is solidly constrained to a frame. The rotating arms are mobile independently of one another; the rotating arms and the support crown are relatively dimensioned so that each rotating arm is supported by the support crown at or near the respective free end.

14 Claims, 17 Drawing Sheets

(58) Field of Classification Search
USPC .............. 198/370.03, 471.1; 414/793, 797, 414/226.01; 901/8
See application file for complete search history.

(56) References Cited

FOREIGN PATENT DOCUMENTS

| | | |
|---|---|---|
| GB | 895181 A | 5/1962 |
| GB | 1270455 A | 4/1972 |
| WO | WO 2015087177 A1 | 6/2015 |

* cited by examiner

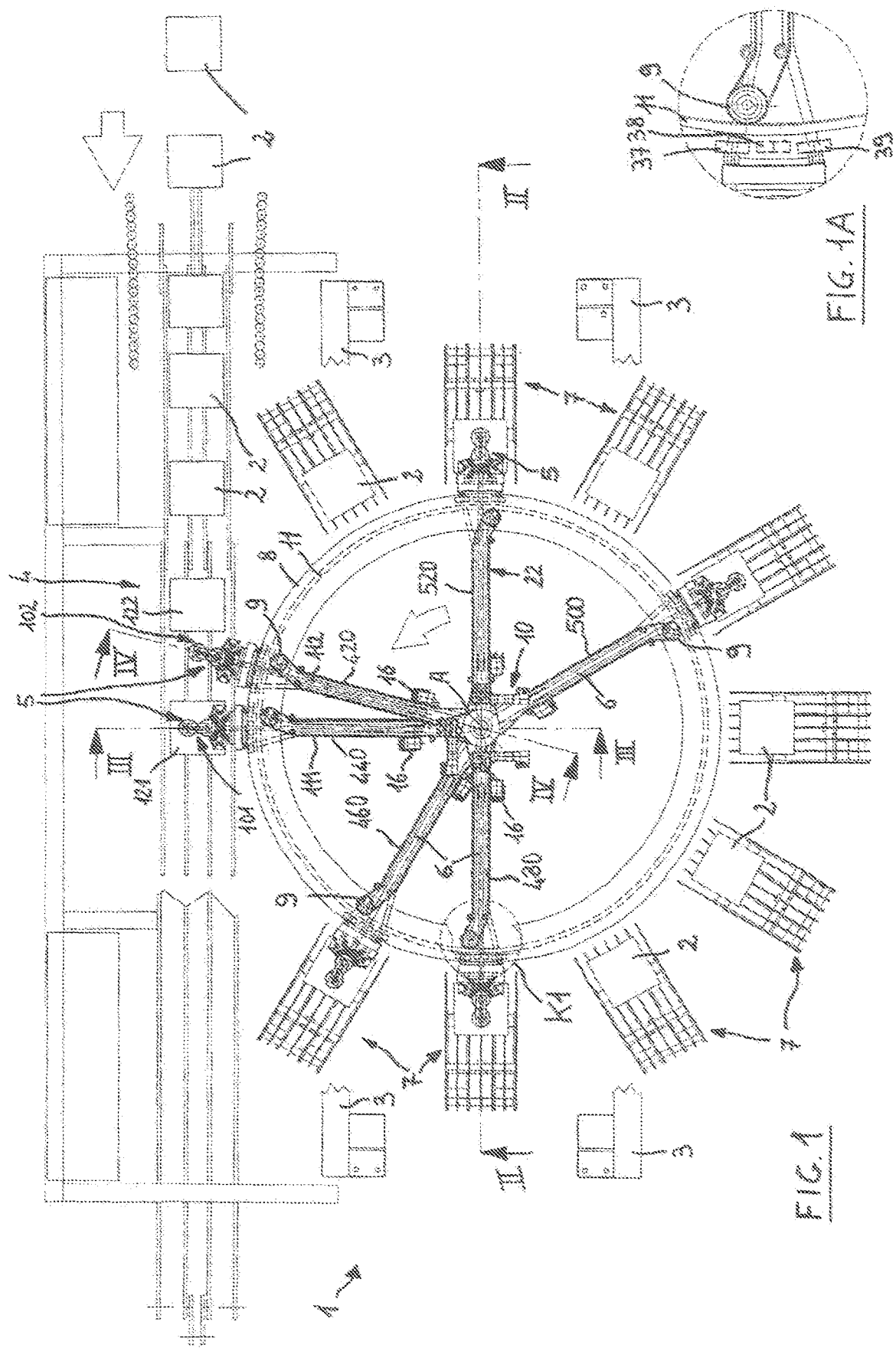

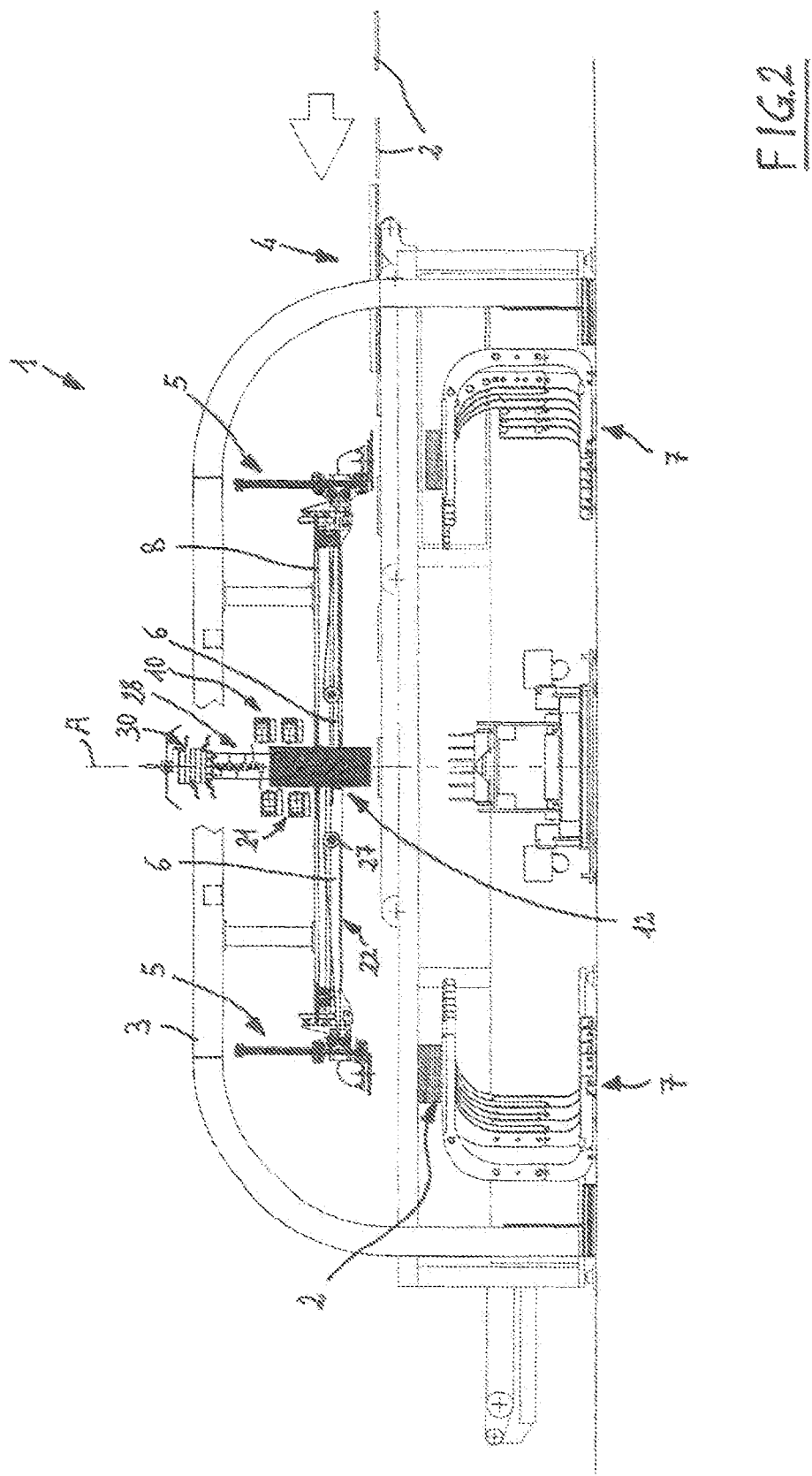

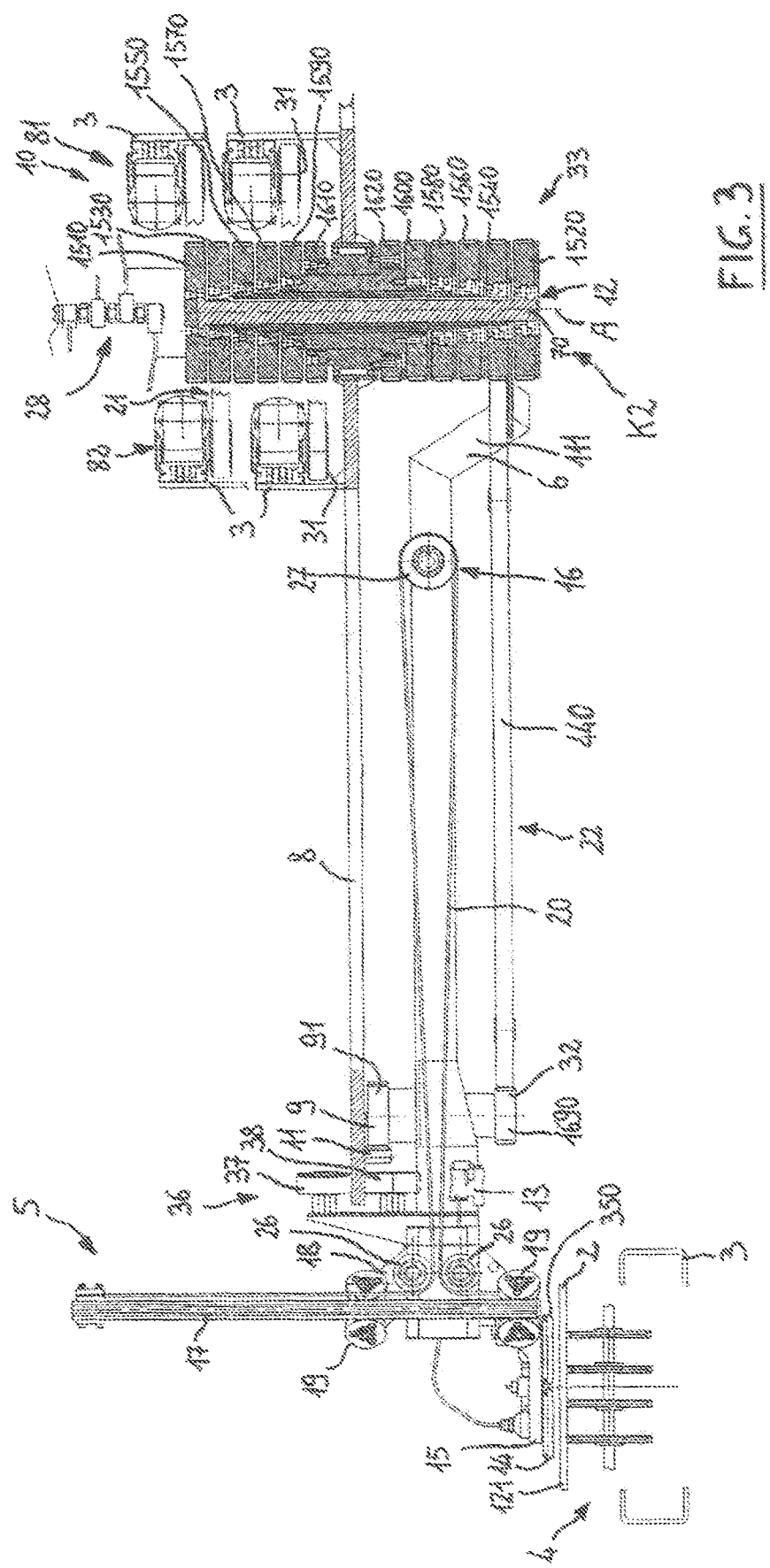

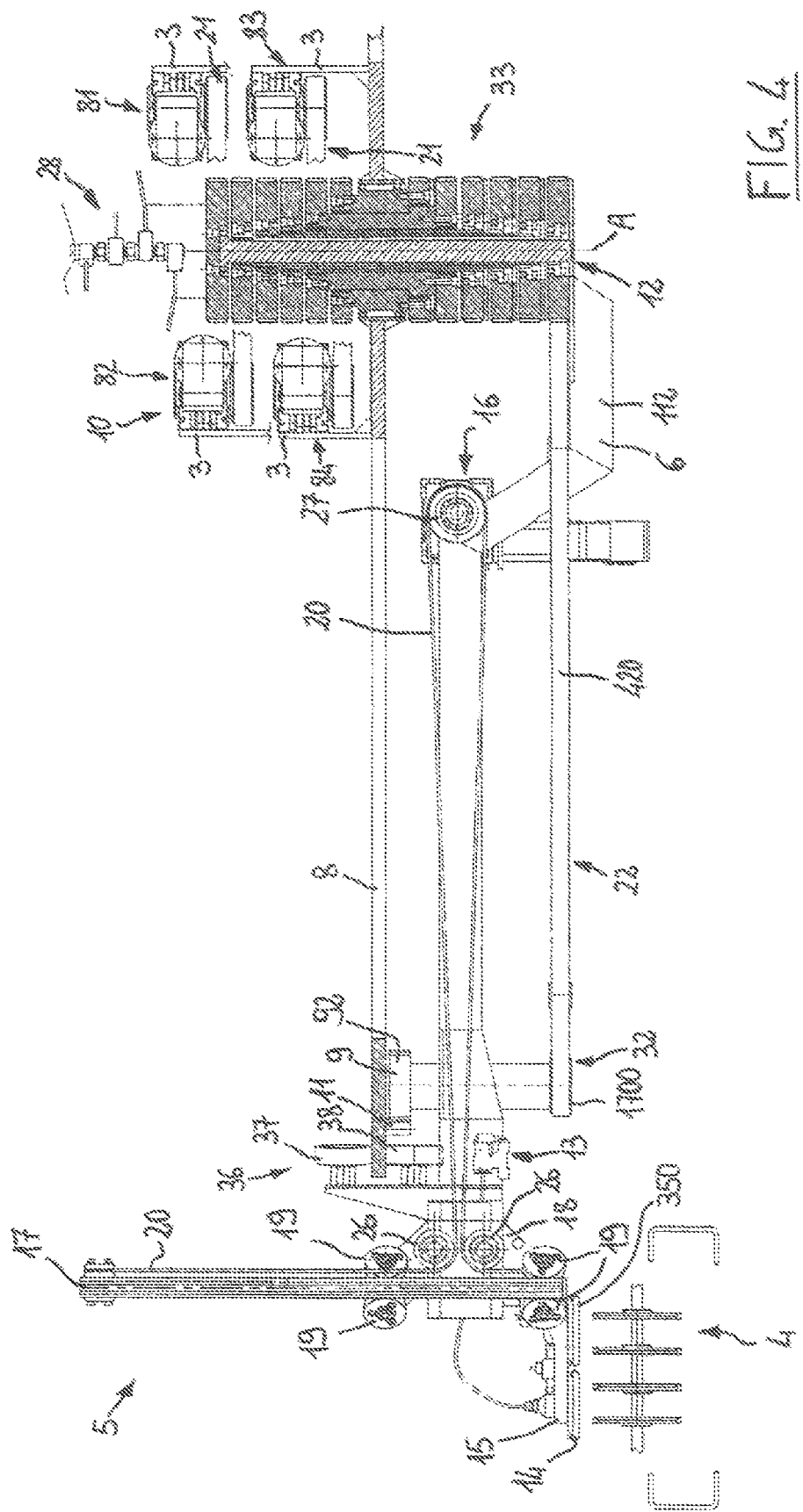

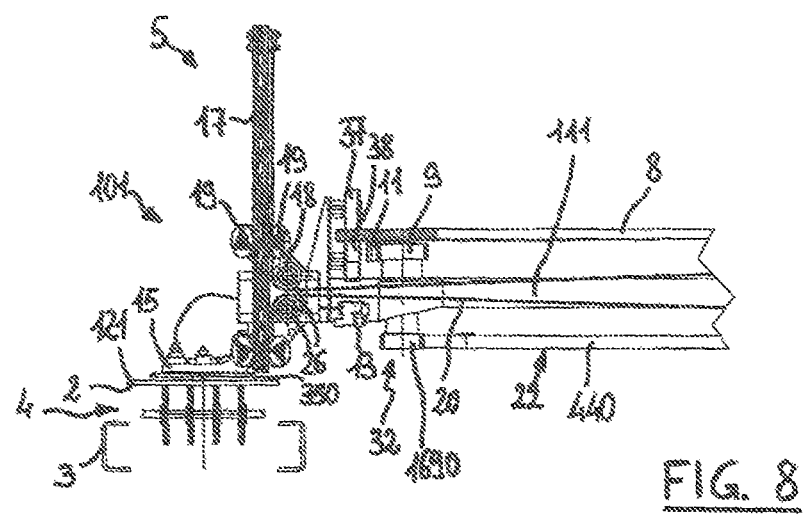
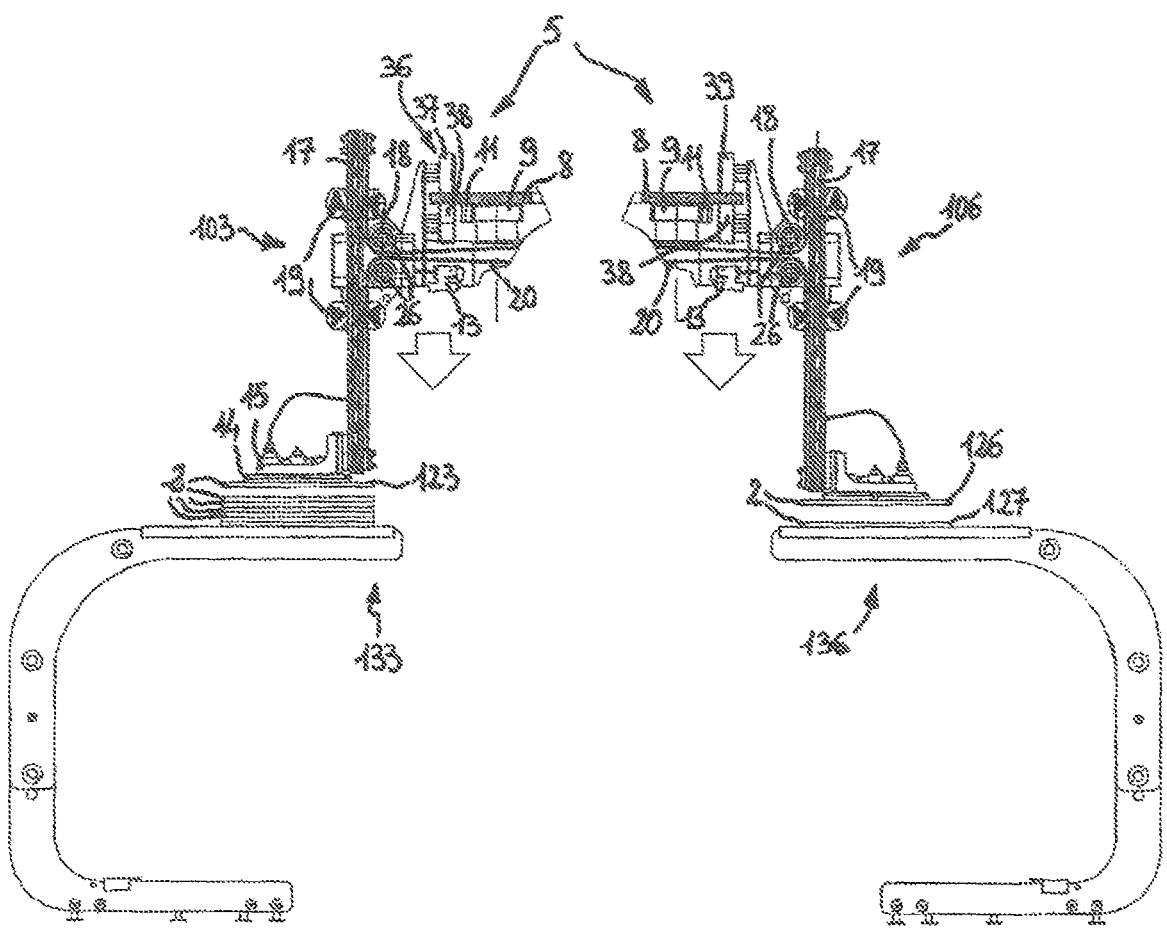
FIG. 8
FIG. 6  FIG. 7

SORTING APPARATUS FOR SORTING AND STACKING TILES

DESCRIPTION OF THE INVENTION

Technical Sector

The present invention relates to the technical sector concerning the sorting and stacking of tiles.

Prior Art

A sorting apparatus is known for sorting and stacking tiles in document EP 3 080 019, comprising:

an inlet line which feeds in tiles to be sorted and arranged in a line;

a sorting carousel which: rotates with respect to a carousel axis; comprises a plurality of suction gripping units; and comprises a plurality of rotating arms which develop radially from the carousel axis, which are equidistanced angularly with respect to one another and which bear the plurality of suction gripping units;

a plurality of seats arranged below the sorting carousel along a portion of a circumference which is coaxial to the carousel axis, which seats are solidly constrained to the frame and are conformed to restingly receive the tiles released by the suction gripping units, forming stacks of tiles.

The sorting apparatus is configured in such a way that a first tile coming from the inlet line can be halted, gripped by a first suction gripping unit of the plurality of suction gripping units, rotated by a first rotating arm of the plurality of rotating arms which bears the first suction gripping unit and released by the first suction gripping unit on a first seat of the plurality of seats.

The sorting carousel must perforce be step-activated: in fact, when a tile is picked up by a suction gripping unit, one or more tiles might have to be contemporaneously released on one or more seats by other suction gripping units. Therefore during a step of collecting a tile, the sorting carousel must be halted in order to be able to pick up a tile from the inlet line and contemporaneously release at least one tile onto a seat. This constitutes a limit to productivity.

Taking account of this, in order to increase productivity it would be necessary to impress high accelerations and decelerations on the sorting carousel, which requires extensive use of electrical power and consumption of electrical energy.

It might therefore be considered to increase the number of rotating arms used, so as to reduce the angular rotation required by the sorting carousel at each pick-up of a tile from the inlet line, but this would lead to an increase in the weight and therefore of the moment of inertia of the sorting carousel itself which would lead to a reduction of the accelerations and decelerations obtainable given a same amount of electricity used, or would lead to an increase in the electrical power used with a further increased in costs.

SUMMARY OF THE INVENTION

The aim of the present invention consists in obviating the above-mentioned drawbacks.

The above aim is attained by a sorting apparatus for sorting and stacking slab-shaped elements, in accordance with claim 1.

The support crown guarantees that, at most, only a minor portion of each rotating arm is projecting. In this way, during steps of sharp acceleration, dangerous flexions of the rotating arms, which may compromise functioning, can be avoided: this possible drawback was not present in the sorting apparatus of known type, described in the foregoing, due to the fact that the rotating arms were angularly equidistanced to one another and rigidly connected to one another. The rotating arms of the sorting apparatus of the invention have the advantage of having a moment of inertia that is much lower than the total moment of inertia of a sorting carousel of the prior art of the above-described type: consequently the rotating arms require a lower electrical power in order to be accelerated and decelerated, so they enable a higher productivity to be obtained.

The fact that the rotating arms are light and mobile independently of one another makes it possible for the sorting apparatus of the invention to operate continuously, which advantageously increases productivity. In fact, a first rotating arm can be activated to have an angular velocity and an angular position that makes possible, by a first suction gripping unit that the first suction gripping unit bears, following and picking up a first slab-shaped element which moves on the inlet line; contemporaneously, a second rotating arm can be halted to make possible, by a second suction gripping unit that the second rotating arm bears, the release of a second slab-shaped element on a seat. Thus the first rotating arm is in movement while the second rotating arm is stationary, thanks to the fact that the rotating arms are mobile independently of one another.

The fact that the rotating arms are independently mobile with respect to one another enables varying the angular distance between two contiguous arms. This is particularly advantageous during the picking-up of the slab-shaped elements, as the angular distance between contiguous arms can be minimised and thus enable picking up a greater number of slab-shaped elements in the time unit from the inlet line, which enables a further increase in productivity: in fact, during the picking-up of a first slab-shaped element from the inlet line, by a first gripping unit borne by a first rotating arm, a second rotating arm can be neared to the first rotating arm up to reaching the minimum angular distance possible therefrom, with the aim of picking up a second slab-shaped element from the inlet line once the first slab-shaped element has been picked up.

BRIEF DESCRIPTION OF THE DRAWINGS

Specific embodiments of the invention will be described in the following part of the present description, according to what is set down in the claims and with the aid of the appended tables of drawings, in which:

FIG. 1 is a schematic view from above of the sorting apparatus for storing and stacking slab-shaped elements of the present invention, according to a first embodiment;

FIG. 1A is a view of larger-scale detail "K1" of FIG. 1;

FIGS. 2, 3, 4 are respectively views of sections II-II, III-III, IV-IV of FIG. 1;

FIGS. 6, 7, 8 are respectively views of sections VI-VI, VII-VII, VIII-VIII of FIG. 5;

DESCRIPTION OF PREFERRED EMBODIMENTS

Figure 5:
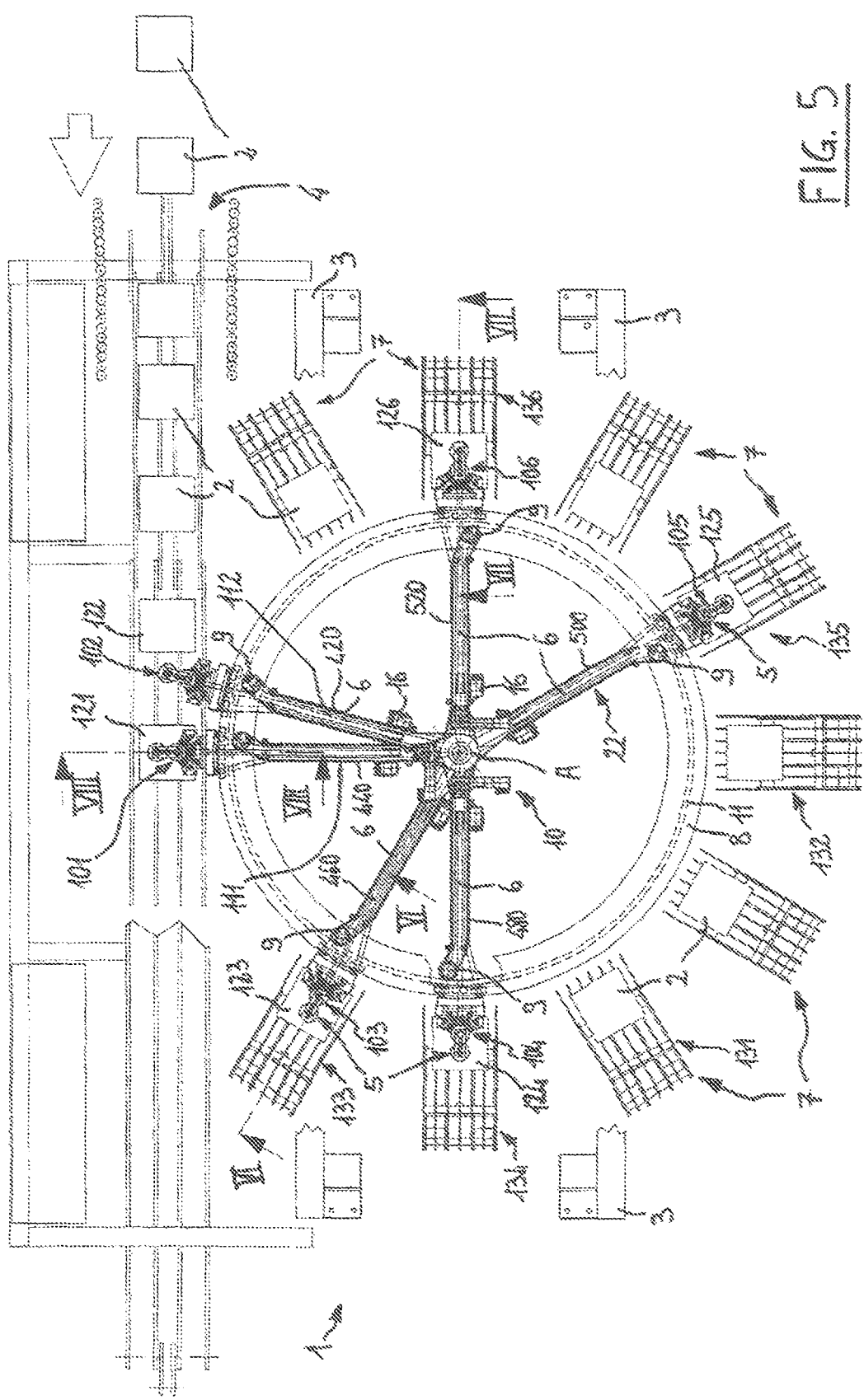
FIG. 5 is identical to FIG. 1, but illustrates other section lines.
Figure 9:
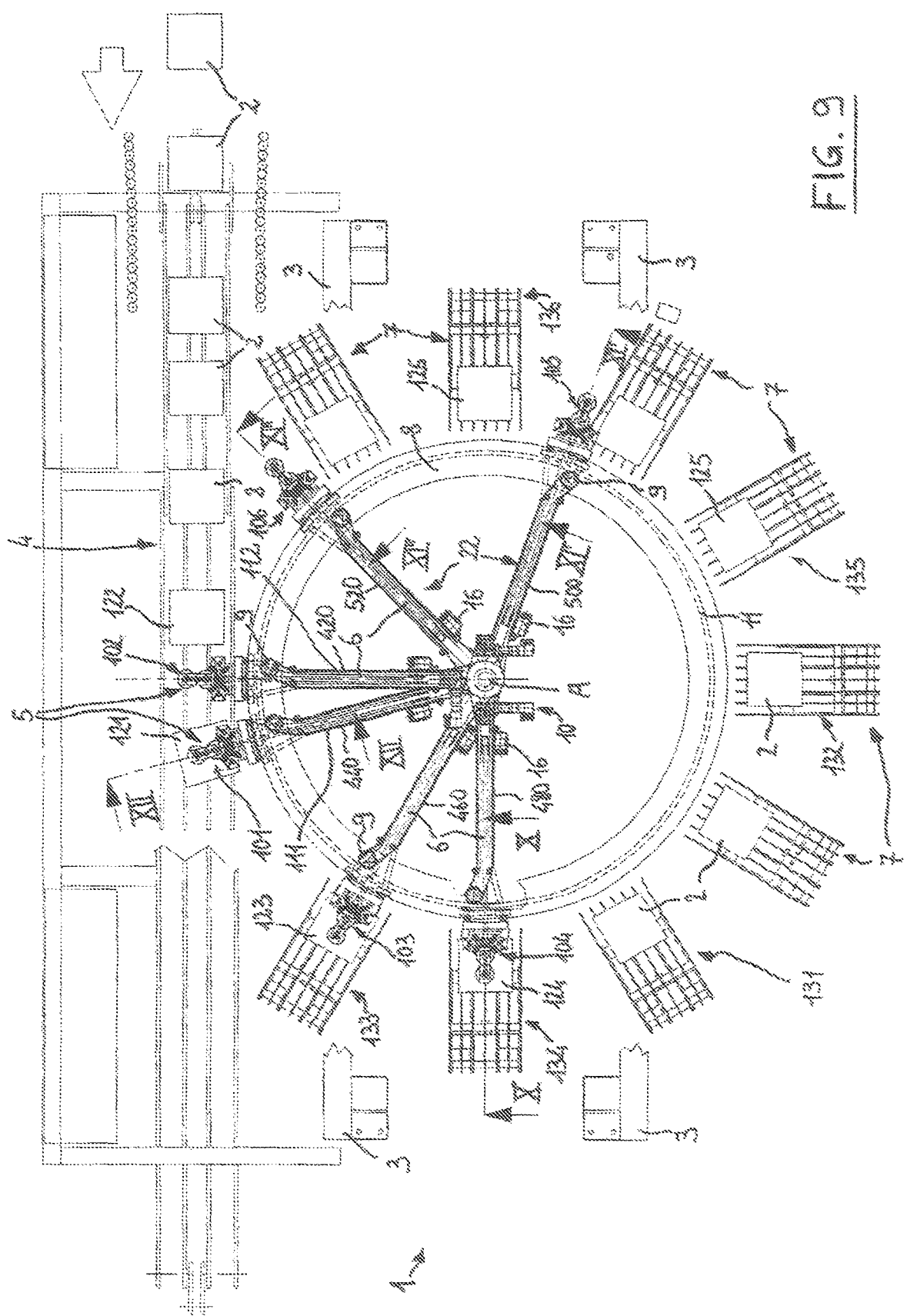
FIG. 9 is the view of the sorting apparatus of FIGS. 1, 5 but in a following operating step.

With reference to the appended tables of drawings, reference numeral (1) denotes a sorting apparatus for sorting and stacking slab-shaped elements (2), object of the present invention, comprising: a frame (3); an inlet line (4) for infeeding slab-shaped elements (2) to be sorted and stacked; a plurality of suction gripping units (5) for gripping slab-shaped elements (2); a plurality of rotating arms (6) which are rotatable with respect to a same rotation axis of the arms (A) and which each bear a suction gripping unit (5) of the plurality of suction gripping units (5); a plurality of seats (7) which are configured to receive the slab-shaped elements (2) released by the plurality of suction gripping units (5), forming stacks of slab-shaped elements (2); a support crown (8) which is solidly constrained to the frame (3). The rotation axis of the arms (A) and the axis of the support crown (8) coincide with one another. The rotating arms (6) of the plurality of rotating arms (6) are mobile independently of one another. The rotating arms (6) of the plurality of rotating arms (6) and the support crown (8) are dimensioned with respect to one another in such a way that each rotating arm (6) of the plurality of rotating arms (6) is supported by the support crown (8) at or in proximity of the relative free end. The sorting apparatus (1) is configured in such a way that: a first slab-shaped element (121) coming from the inlet line (4) can be gripped by a first suction gripping unit (101) of the plurality of suction gripping units (5), rotated by a first rotating arm (111) of the plurality of rotating arms (6) which bears the first suction gripping unit (101) and released by the first suction gripping unit (101) on a first seat (131) of the plurality of seats (7); contemporaneously, a second slab-shaped element (122) coming from the inlet line (4) and subsequent to the first slab-shaped element (121), can be gripped by a second suction gripping unit (102) of the plurality of suction gripping units (5), rotated by a second rotating arm (112) of the plurality of rotating arms (6) which is contiguous to the first rotating arm (111) and which bears the second suction gripping unit (102) and released by the second suction gripping unit (102) on a second seat (132) of the plurality of seats (7) (FIGS. 5, 9).

The slab-shaped elements (2) are preferably tiles.

The inlet line (4) is preferably suitable for infeeding the slab-shaped elements (2) in a line.

The inlet line (4) is preferably suitable for infeeding the slab-shaped elements (2) continuously, i.e. at a constant velocity.

Each suction gripping unit (5) of the plurality of suction gripping units (5) is preferably configured at least to pick up a slab-shaped element (2) from the inlet line (4) (FIG. 8), lift the slab-shaped element (2) (FIG. 12), lower the slab-shaped element (2) (FIGS. 6, 7) and release the slab-shaped element (2) (FIG. 10) on a seat (7) of the plurality of seats (7).

Each rotating arm (6) of the plurality of rotating arms (6) is preferably supported by the support crown (8) in such a way that at the most only a portion thereof is projecting. The projecting portion of each rotating arm (6), if present, is preferably smaller than the remaining part of the rotating arm (6) which is not projecting. See for example FIGS. 3, 4.

Each rotating arm (6) of the plurality of rotating arms (6) preferably bears a suction gripping unit (5) of the plurality of suction gripping units (5) at the relative free end, so that only that suction gripping unit (5) is cantilevered and projects externally from the support crown (8). By way of example, see again FIGS. 3, 4.

The plurality of seats (7) are preferably arranged along a circumference that is concentric with the rotation axis of the arms of the plurality of rotating arms (6). See for example FIG. 1, in which it can be seen that the circumference has a larger diameter than the support crown (8).

The seats (7) of the plurality of seats (7) are preferably solidly constrained to the frame (3), being for example fixed to the ground surface.

The support crown (8) is preferably circular. See FIGS. 1, 5, 9.

Each rotating arm (6) of the plurality of rotating arms (6) preferably comprises a constrained end constrained to the rotation axis of the arms (A) and which is opposite the free end. See FIGS. 3, 4, 15, 16.

The ends of the rotating arms (6) of the plurality of rotating arms (6) which are at the rotation axis of the arms (A) are preferably: arranged at different heights to one another, and conformed in such a way as not to obstruct one another (compare FIGS. 3 and 4 for example) so that it is possible to minimise the angular distance attainable between two contiguous rotating arms (6) of the plurality of rotating arms (6).

The reduction of the angular distance between two contiguous rotating arms (6) enables increasing the number of slab-shaped elements (2) that can be picked up from the inlet line (4) in the time unit, and thus advantageously increase the productivity.

Each suction gripping unit (5) of the plurality of suction gripping units (5) preferably comprises: a depression source (13); at least a first suction cup (14) connected to the depression source (13); a suction cup support (15) which bears the first suction cup (14), which is movable to be raised and lowered so that the first suction cup can pick up a slab-shaped element (2) from the inlet line (4) and can release the slab-shaped element (2) on a seat (7) of the plurality of seats (7); and a raising motor (16) for raising the suction cup support (15).

Each raising motor (16) is preferably arranged in proximity of the rotation axis of the arms (A) in order to limit the relative moment of inertia with respect to the same rotation axis of the arms (A). See for example FIGS. 3, 4.

Each suction gripping unit (5) of the plurality of suction gripping units (5) can comprise: a carriage (17) that bears the suction cup support (15) at a first end; a guide (18, 19) comprising a pulley support (18) which is solidly constrained to the rotating arm (6) which bears the suction gripping unit (5), and the guide pulleys (19) (for example two four-pulley guide units (19) at different heights with respect to one another) which are rotatably by the pulley support (18) and which are arranged with respect to one another in such a way as to roll against the carriage (17), enabling the latter to lift (FIG. 10) and lower (FIGS. 6, 7); a transmission chain (20) which at an end thereof is fixed to the first end of the carriage (17) and which at the other side is fixed to a second end, opposite the first end, of the carriage (17); two return pulleys (26) which are rotatably borne by the rotating arm (6) which bears the suction gripping unit (5) and which engage with the second transmission chain (20) in order to return the second transmission chain (20) towards the raising motor (16); and a service pulley (27) which is solidly constrained to the drive shaft of the raising motor (16) which engages with the second transmission chain (20), so that the raising motor (16) can raise or lower the carriage (17) and thus the suction cup support (15) and the first suction cup (14). The two return pulleys (26) and the service pulley (27) are preferably cogged and the second transmission chain (20) is cogged. The carriage (17) can be a profiled element.

Each suction gripping unit (5) can comprise a second suction cup (350) connected to the depression source (13) and borne by the suction cup support (15), see for example FIG. 3.

The sorting apparatus (1) can comprise a rotary pneumatic joint (28), which powers each suction gripping unit (5) of the plurality of suction gripping units (5). By way of example, FIGS. 15, 16 illustrate a tube (29) (in a broken line) which connects the rotary pneumatic joint (28) with the depression source (13) of a suction gripping unit (5); the other connecting tubes that connect the rotary pneumatic joint (28) to the depression sources (13) of the other suction gripping units (5) have not been illustrated for the sake of simplicity.

Figure 15:
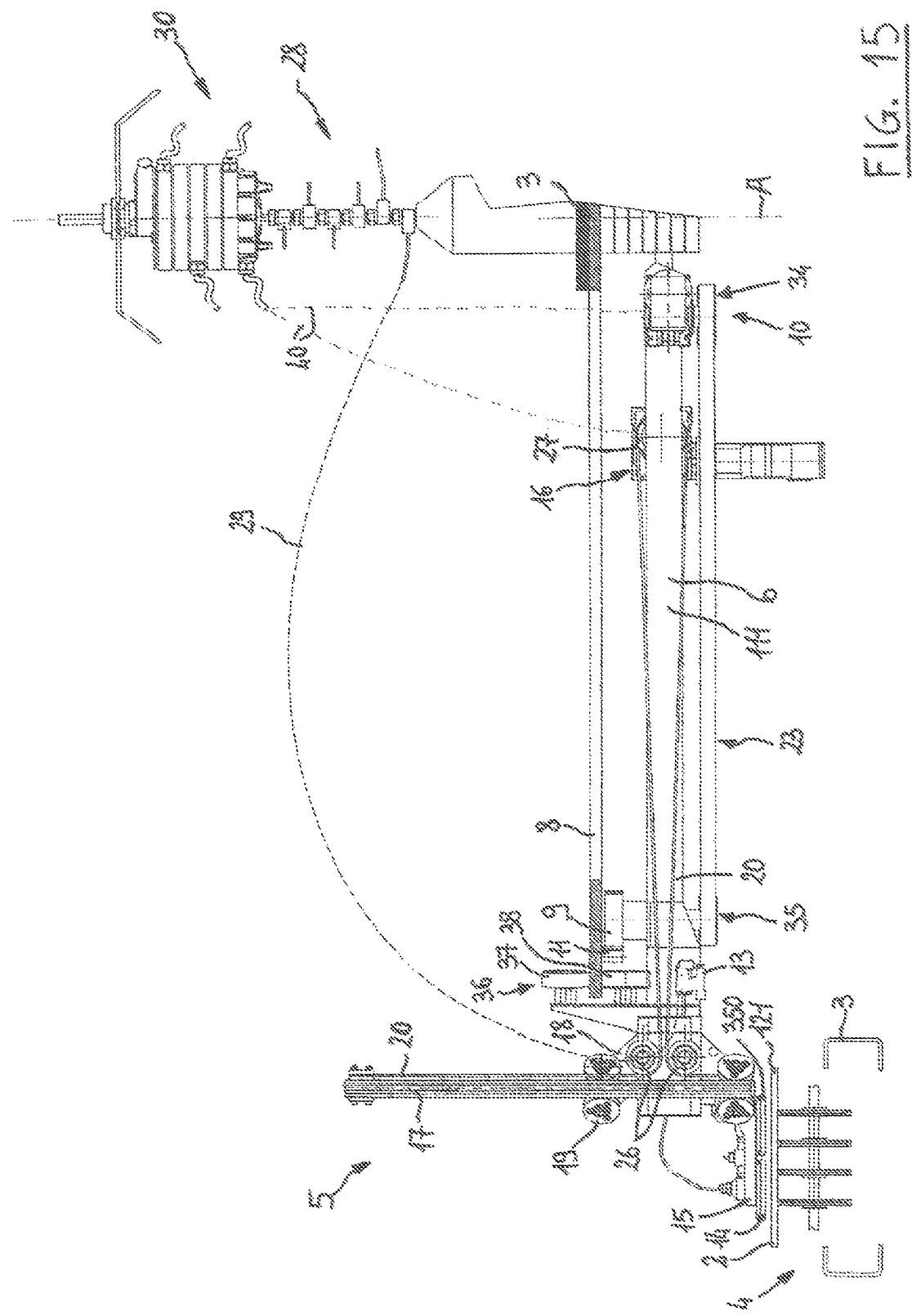
Figure 16:
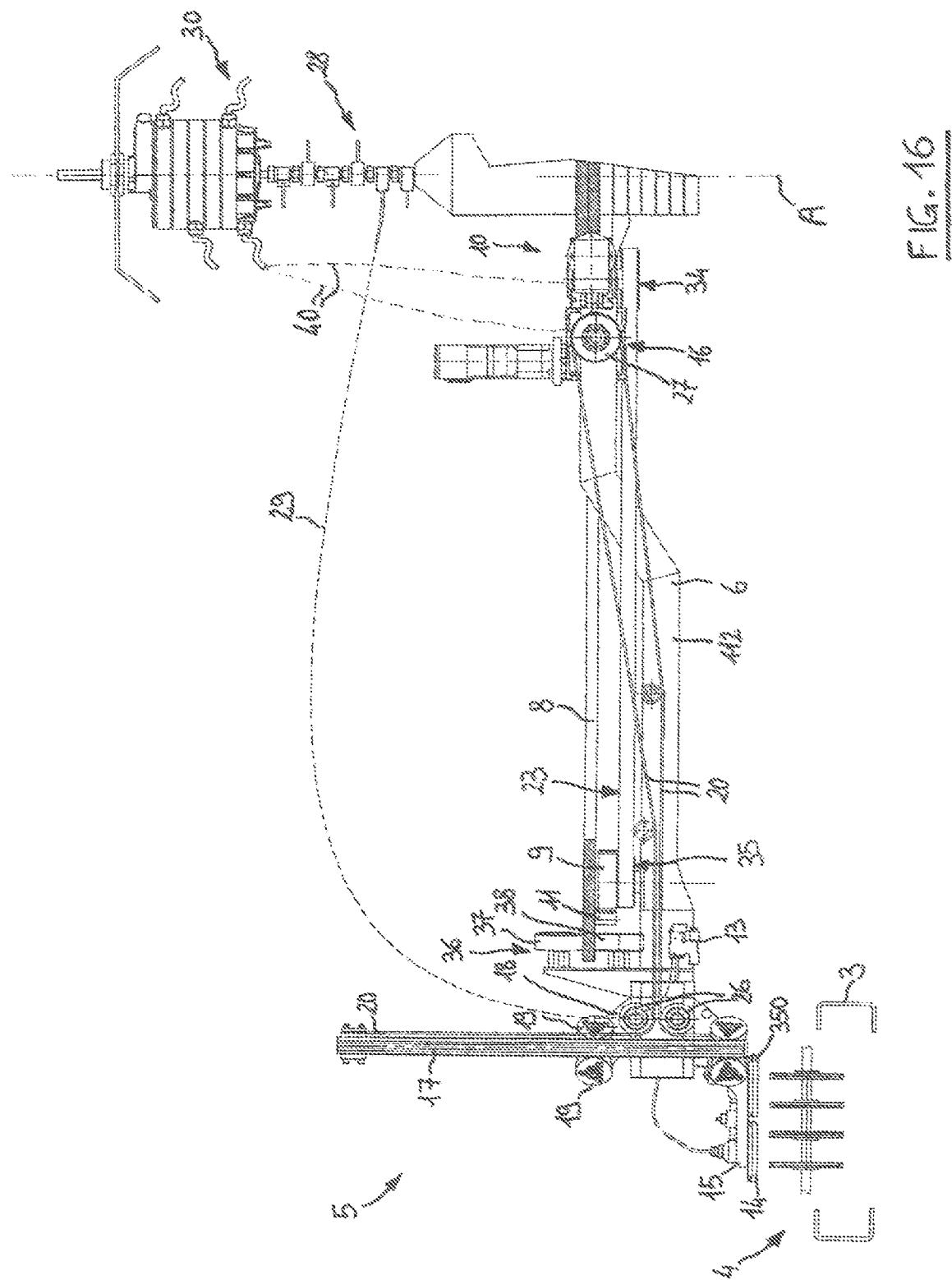
Figure 17:
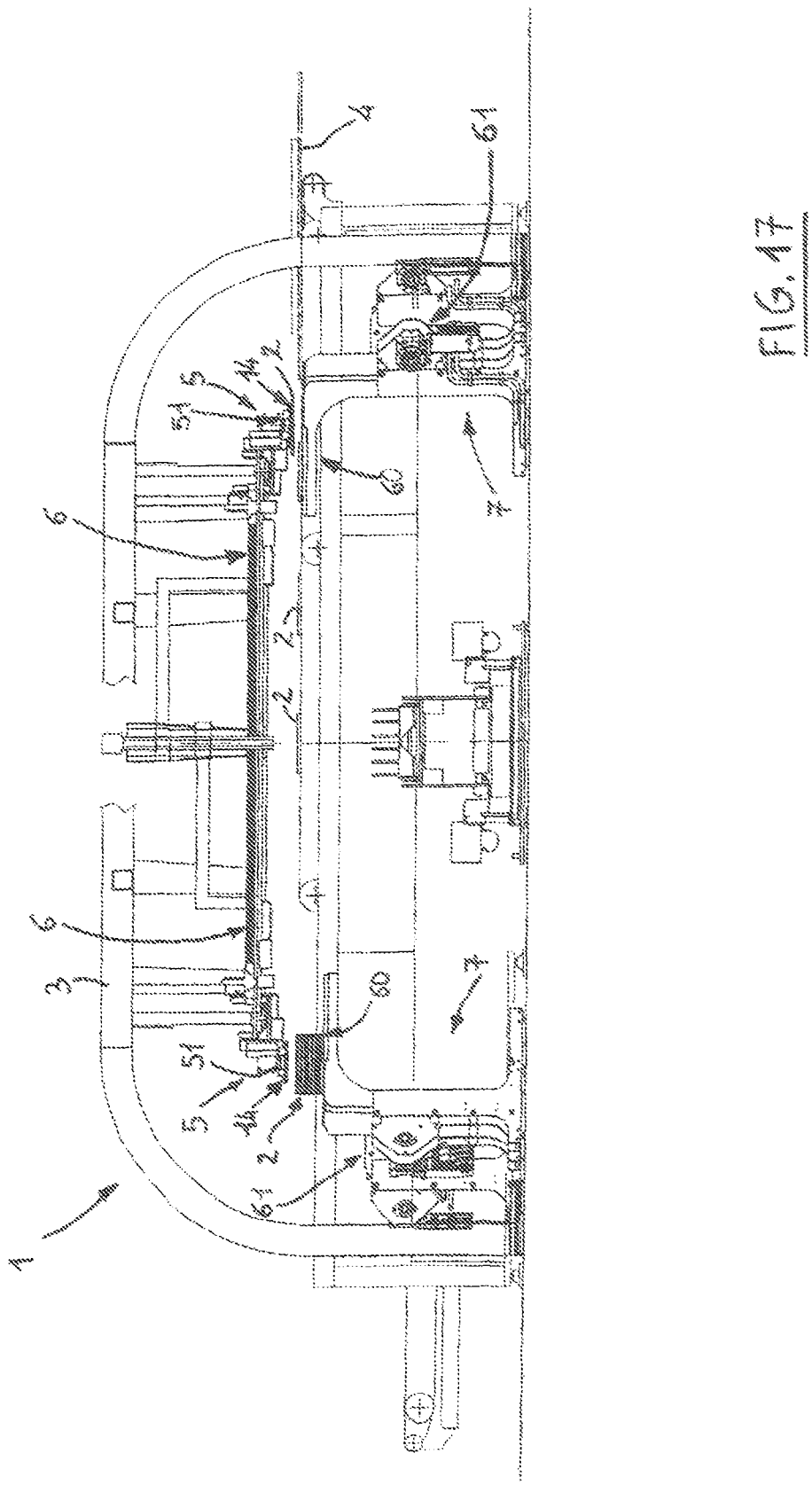
FIG. 17 is a front view of the sorting apparatus of the invention according to a possible variant embodiment concerning the suction gripping units and the seats for receiving the slab-shaped elements.

The sorting apparatus (1) can comprise a rotary electrical joint with sliding contacts (30) in order to supply data signals and electricity on board each rotating arm (6) of the plurality of rotating arms (6); see the two electrical connections (40) illustrated in FIGS. 15, 16, by way of example.

The sorting apparatus (1) preferably comprises a plurality of wheels (36); each rotating arm (6) of the plurality of rotating arms (6) bears: a first wheel (37) of the plurality of wheels (36) which is arranged at or in proximity of the relative free end in order to abut the support crown (8) and in order to roll on the upper side of the support crown (8), and a second wheel (38) of the plurality of wheels (36) which is arranged at or in proximity of the relative free end so as to abut the support crown (8) and to roll on the lower side of the support crown (8), so that the rotating arm (6) is constrained to slide along the support crown (8).

Each rotating arm (6) of the plurality of rotating arms (6) can also bear a third wheel (39) (FIG. 1A) of the plurality of wheels (36) which is arranged in proximity of the first wheel (37), and which is arranged at or in proximity of the relative free end in order to abut the support crown (8) and in order to roll on the upper side of the support crown (8).

The seats (7) of the plurality of seats (7) are preferably arranged externally of the support crown (8) and wherein each suction gripping unit (5) of the plurality of suction gripping units (5) is arranged externally of the support crown (8), see for example FIG. 1.

The support crown (8) preferably bears a circular cogging (11) (visible only in the larger detail of FIG. 1A); the sorting apparatus (1) comprises a plurality of pinions (9) (for example FIGS. 3, 4) and a plurality of rotation-activating motors (10) (for example FIGS. 1, 3, 4); each pinion (9) of the plurality of pinions (9) is borne rotatably by an associated rotating arm (6) of the plurality of rotating arms (6) and is arranged so as to enmesh with the circular cogging (11) (see for example FIG. 3), so that on activation in rotation of the pinion (9) there is a corresponding rotation of the rotating arm (6); each rotation-activating motor (10) of the plurality of rotation-activating motors (10) is arranged so as to activate in rotation an associated pinion (9) of the plurality of pinions (9).

The circular cogging (11) preferably projects from the support crown (8) and is facing towards the axis of the support crown (8). In the figures (for example FIG. 3) the circular cogging (11) projects inferiorly from the support crown (8).

According to the first embodiment of FIGS. 1-12:

each rotation-activating motor (10) of the plurality of rotation-activating motors (10) is borne by the frame (3) (see for example FIG. 3);

the sorting apparatus (1) comprises a plurality of connecting shafts (12) which are coaxial to the rotation axis of the arms (A) and which are inserted one inside another with freedom to rotate independently of one another;

the sorting apparatus (1) comprises a first plurality of transmissions (21);

each transmission of the first plurality of transmissions (21) connects the drive shaft of an associated rotation-activating motor (10) of the plurality of rotation-activating motors (10) with an associated connecting shaft (12) of the plurality of connecting shafts (12);

the sorting apparatus (1) comprises a second plurality of transmissions (22);

each transmission of the second plurality of transmissions (22) connects an associated connecting shaft (12) of the plurality of connecting shafts (12) with a pinion (9) of the plurality of pinions (9);

the sorting apparatus (1) is configured in such a way that each rotation-activating motor (10) of the plurality of rotation-activating motors (10) can activate in rotation an associated rotating arm (6) of the plurality of rotating arms (6) via an associated transmission of the first plurality of transmissions (21), an associated connecting shaft (12) of the plurality of connecting shafts (12), an associated transmission of the second plurality of transmissions (22) and an associated pinion (9) of the plurality of pinions (9).

Figure 3A:
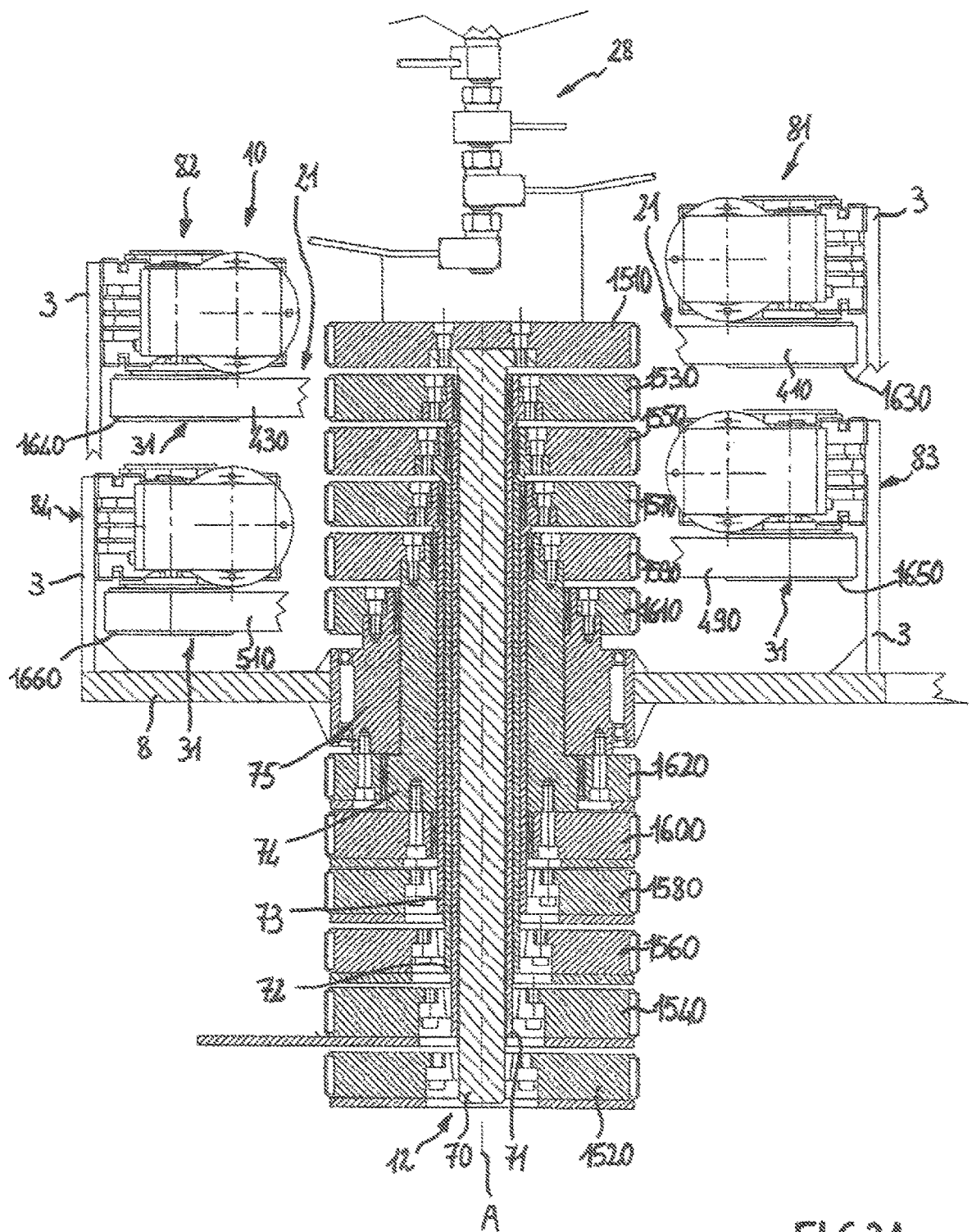
FIG. 3A is a view of larger-scale detail "K2" of FIG. 3.

The plurality of connecting shafts (12) are preferably rotatable with respect to the frame (3) (see FIG. 3A).

The sorting apparatus (1) preferably comprises a first plurality of pulleys (31); each pulley of the first plurality of pulleys (31) is solidly constrained to the drive shaft of an associated rotation-activating motor (10) of the plurality of rotation-activating motors (10) (see for example FIGS. 3, 3A) and engages with an associated transmission of the first plurality of transmissions (21).

The sorting apparatus (1) preferably comprises a second plurality of pulleys (32); each pulley of the second plurality of pulleys (32) is solidly constrained to an associated pinion (9) of the plurality of pinions (9) and engages with an associated transmission of the second plurality of transmissions (22).

The sorting apparatus (1) preferably comprises a third plurality of pulleys (33); the plurality of connecting shafts (12) comprises a primary connecting shaft (70) and a first tubular connecting shaft (71); the third plurality of pulleys (33) comprises: a first pulley (1510) which is solidly connected to the primary connecting shaft (70) and which engages with a first transmission (410) of the first plurality of transmissions (21); and a second pulley (1520) that is solidly connected to the primary connecting shaft (70) and engages with a second transmission (420) of the second plurality of transmissions (22); the primary connecting shaft (70) is arranged internally of the first tubular connecting shaft (71) and exits from a first end of the first tubular connecting shaft (71) with the first pulley (1510) and from a second end of the first tubular connecting shaft (71) with the second pulley (1520); the third plurality of pulleys (33) further comprises: a third pulley (1530) which is solidly connected to the first tubular connecting shaft (71), which is interposed between the first pulley (1510) and the second pulley (1520), and which engages with a third transmission (430) of the first plurality of transmissions (21); and a fourth pulley (1540) which is solidly connected to the first tubular connecting shaft (71), which is interposed between the first pulley (1510) and the second pulley (1520), and which engages with a fourth transmission (440) of the second plurality of transmissions (22).

The plurality of connecting shafts (12) preferably comprises a second tubular connecting shaft (72); the first tubular connecting shaft (71) is arranged internally of the second tubular connecting shaft (72) and exits from a first end of the second tubular connecting shaft (72) with the third pulley (1530) and from a second end of the second tubular connecting shaft (72) with the fourth pulley (1540); the third plurality of pulleys (33) further comprises: a fifth pulley (1550) which is solidly connected to the second tubular connecting shaft (72), which is interposed between the third pulley (1530) and the fourth pulley (1540) and which engages with a fifth transmission (not visible in the drawings) of the first plurality of transmissions (21); and a sixth pulley (1560) which is solidly connected to the second tubular connecting shaft (72), which is interposed between the third pulley (1530) and the fourth pulley (1540), and which engages with a sixth transmission (460) of the second plurality of transmissions (22). See FIG. 3A.

The plurality of connecting shafts (12) preferably comprises a third tubular connecting shaft (73); the second tubular connecting shaft (72) is arranged internally of the third tubular connecting shaft (73) and exits from a first end of the third tubular connecting shaft (73) with the fifth pulley (1550) and from a second end of the third tubular connecting shaft (73) with the sixth pulley (1560); the third plurality of pulleys (33) further comprises: a seventh pulley (1570) which is solidly connected to the third tubular connecting shaft (73), which is interposed between the fifth pulley (1550) and the sixth pulley (1560), and which engages with a seventh transmission (not visible in the drawings) of the first plurality of transmissions (21); and a eighth pulley (1580) which is solidly connected to the third tubular connecting shaft (73), which is interposed between the fifth pulley (1550) and the sixth pulley (1560), and which engages with an eighth transmission (480) of the second plurality of transmissions (22). The plurality of connecting shafts (12) preferably comprises a fourth tubular connecting shaft (74); the third tubular connecting shaft (73) is arranged internally of the fourth tubular connecting shaft (74) and exits from a first end of the fourth tubular connecting shaft (74) with the seventh pulley (1570) and from a second end of the fourth tubular connecting shaft (74) with the eighth pulley (1580); the third plurality of pulleys (33) further comprises: a ninth pulley (1590) which is solidly connected to the fourth tubular connecting shaft (74), which is interposed between the seventh pulley (1570) and the eighth pulley (1580), and which engages with a ninth transmission (490) (FIG. 3A) of the first plurality of transmissions (21); and a tenth pulley (1600) which is solidly connected to the fourth tubular connecting shaft (74), which is interposed between the seventh pulley (1570) and the eighth pulley (1580), and which engages with a tenth transmission (500) of the second plurality of transmissions (22).

The plurality of connecting shafts (12) preferably comprises a fifth tubular connecting shaft (75); the fourth tubular connecting shaft (74) is arranged internally of the fifth tubular connecting shaft (75) and exits from a first end of the fifth tubular connecting shaft (75) with the ninth pulley (1590) and from a second end of the fifth tubular connecting shaft (75) with the tenth pulley (1600); the third plurality of pulleys (33) further comprises: an eleventh pulley (1610) which is solidly connected to the fifth tubular connecting shaft (75), which is interposed between the ninth pulley (1590) and the tenth pulley (1600), and which engages with an eleventh transmission (510) (FIG. 3A) of the first plurality of transmissions (21), and a twelfth pulley (1620) which is solidly connected to the fifth tubular connecting shaft (75), which is interposed between the ninth pulley (1590) and the tenth pulley (1600), and which engages with a twelfth transmission (520) (FIG. 1) of the second plurality of transmissions (22).

With reference to FIGS. 1-12, the plurality of rotation-activating motors (10) can comprise a first rotation-activating motor (81), a second rotation-activating motor (82), a third rotation-activating motor (83), a fourth rotation-activating motor (84), a fifth rotation-activating motor (10) (not visible) and a sixth rotation-activating motor (10) (not visible). The first plurality of pulleys (31) can comprise a thirteenth pulley (1630), a fourteenth pulley (1640), a fifteenth pulley (1650), a sixteenth pulley (1660), a seventeenth pulley (1670) (not visible) and an eighteenth pulley (1680) (not visible). The thirteenth pulley (1630) is solidly constrained to the drive shaft of the first rotation-activating motor (81) and engages with the first transmission (410). The fourteenth pulley (1640) is solidly constrained to the drive shaft of the second rotation-activating motor (82) and engages with the third transmission (430). The fifteenth pulley (1650) is solidly constrained to the drive shaft of the third rotation-activating motor (83) and engages with the ninth transmission (490). The sixteenth pulley (1660) is solidly constrained to the drive shaft of the fourth rotation-activating motor (84) and engages with the eleventh transmission (510).

The second rotation-activating motor (82) can draw the first rotating arm (111) in rotation (FIG. 3), while the first rotation-activating motor (81) can draw the second rotating arm (112) in rotation (FIG. 4).

With reference to FIGS. 3, 4, the second plurality of pulleys (32) can comprise a nineteenth pulley (1690) and a twentieth pulley (1700); the plurality of pinions (9) can comprise a first pinion (91) and a second pinion (92). The nineteenth pulley (1690) can be solidly constrained to the first pinion (91) and can engage with the fourth transmission (440), while the twentieth pulley (1700) can be solidly constrained to the second pinion (92) and can engage with the second transmission (420).

FIGS. 5-8 illustrate a first operating step of the sorting apparatus (1), wherein, contemporaneously: the first suction gripping unit (101) is picking up the first slab-shaped element (121) from the inlet line (4), FIG. 8; the second suction gripping unit (102) is reaching the inlet line (4) to pick up the second slab-shaped element (122); a third suction gripping unit (103) of the plurality of suction gripping units (5) is releasing a third slab-shaped element (123) on a stack of slab-shaped elements (2) which are arranged on a third seat (133) of the plurality of seats (7), FIG. 6; a fourth suction gripping unit (104) of the plurality of suction gripping units (5) is releasing a fourth slab-shaped element (124) on a fourth seat (134) of the plurality of seats (7); a fifth suction gripping unit (105) of the plurality of suction gripping units (5) is releasing a fifth slab-shaped element (125) on a fifth seat (135) of the plurality of seats (7); a sixth suction gripping unit (106) of the plurality of suction gripping units (5) is releasing a sixth slab-shaped element (126) on a seventh slab-shaped element (127) which are arranged on a sixth seat (136) of the plurality of seats (7), FIG. 7, thus forming a stack formed by two slab-shaped elements (2).

Figure 12:
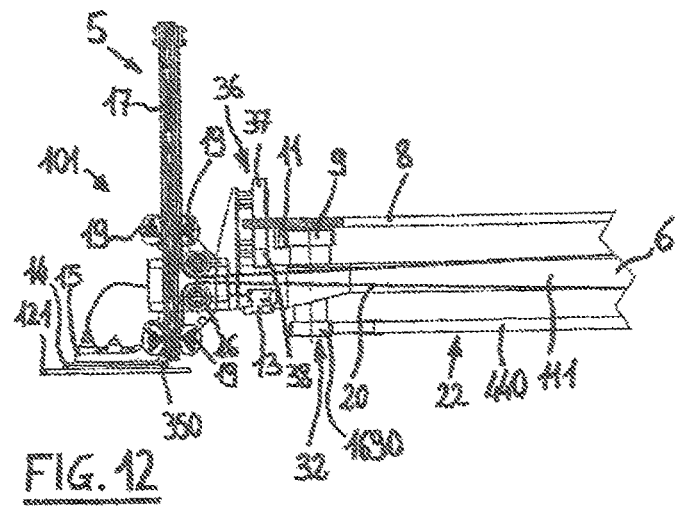
FIG. 12 is a section view along XII-XII of FIG. 9.
Figure 11:
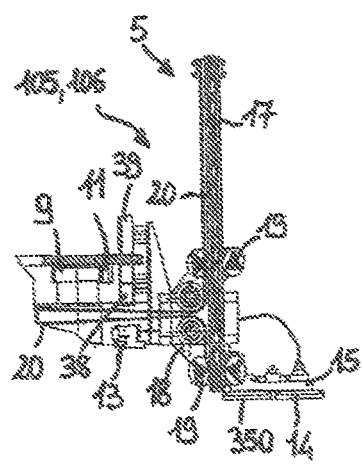
FIG. 11 is a section view along XI'-XI', XI"-XI" of FIG. 9.
Figure 10:
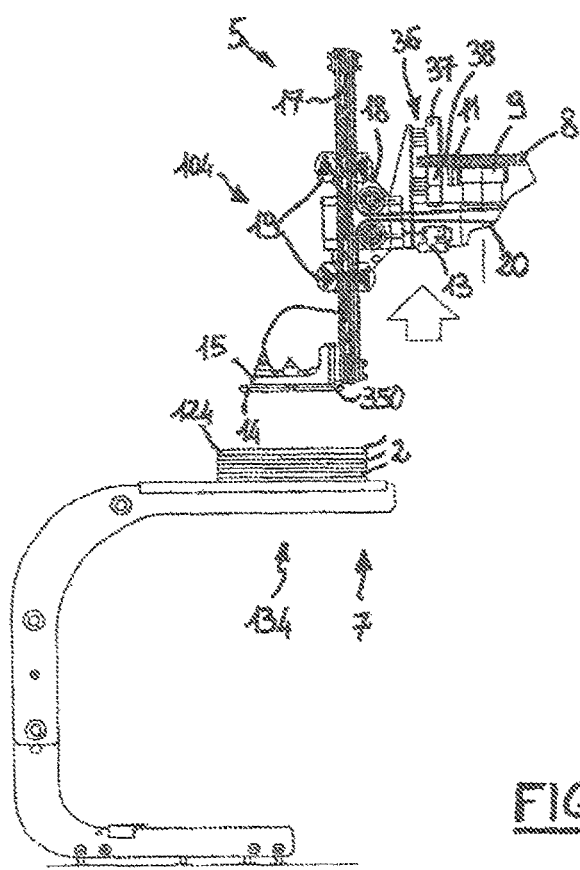
FIG. 10 is a section view along X-X of FIG. 9.
Figure 13:
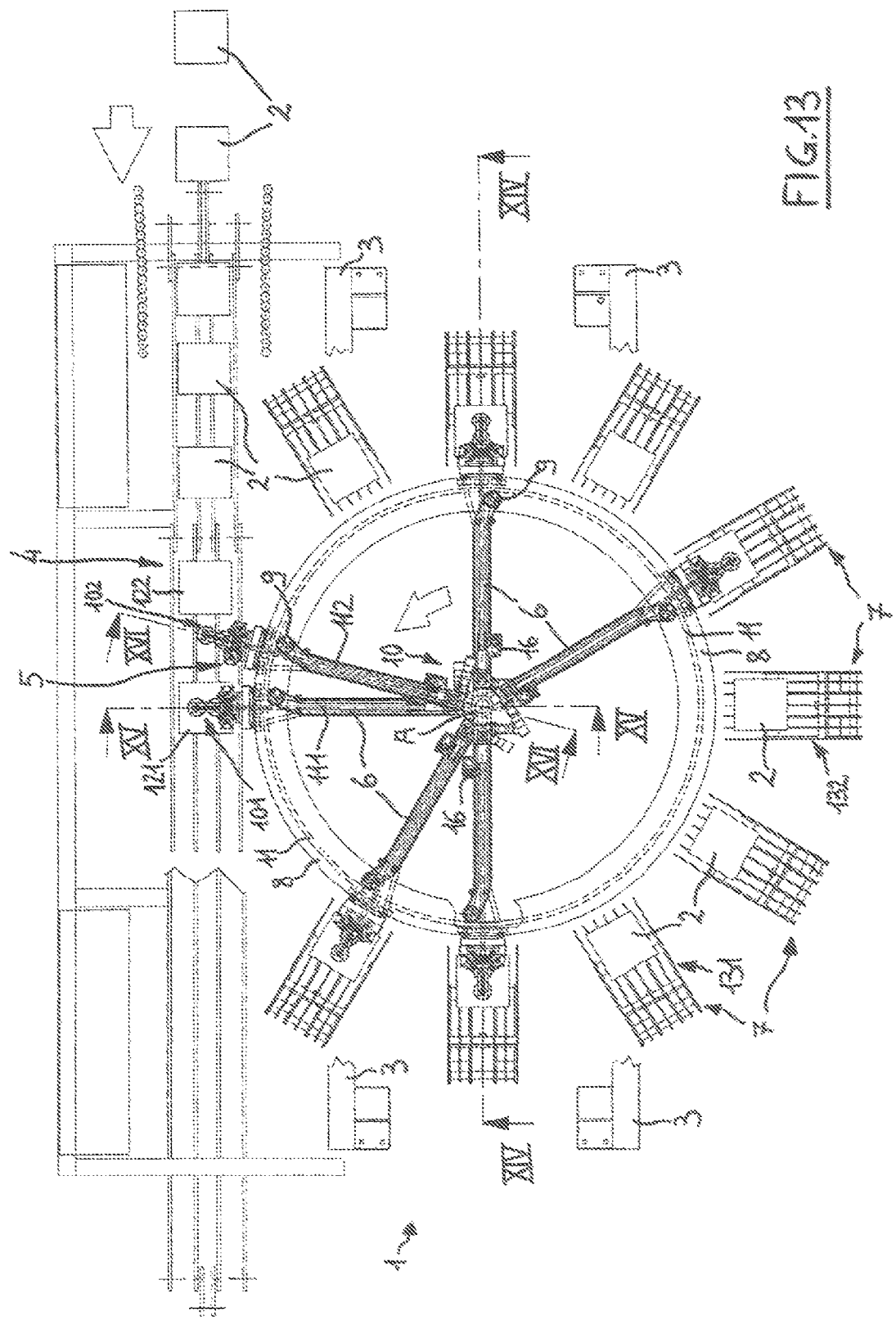
FIG. 13 is a schematic view from above of the sorting apparatus of the invention, according to a second embodiment.
Figure 14:
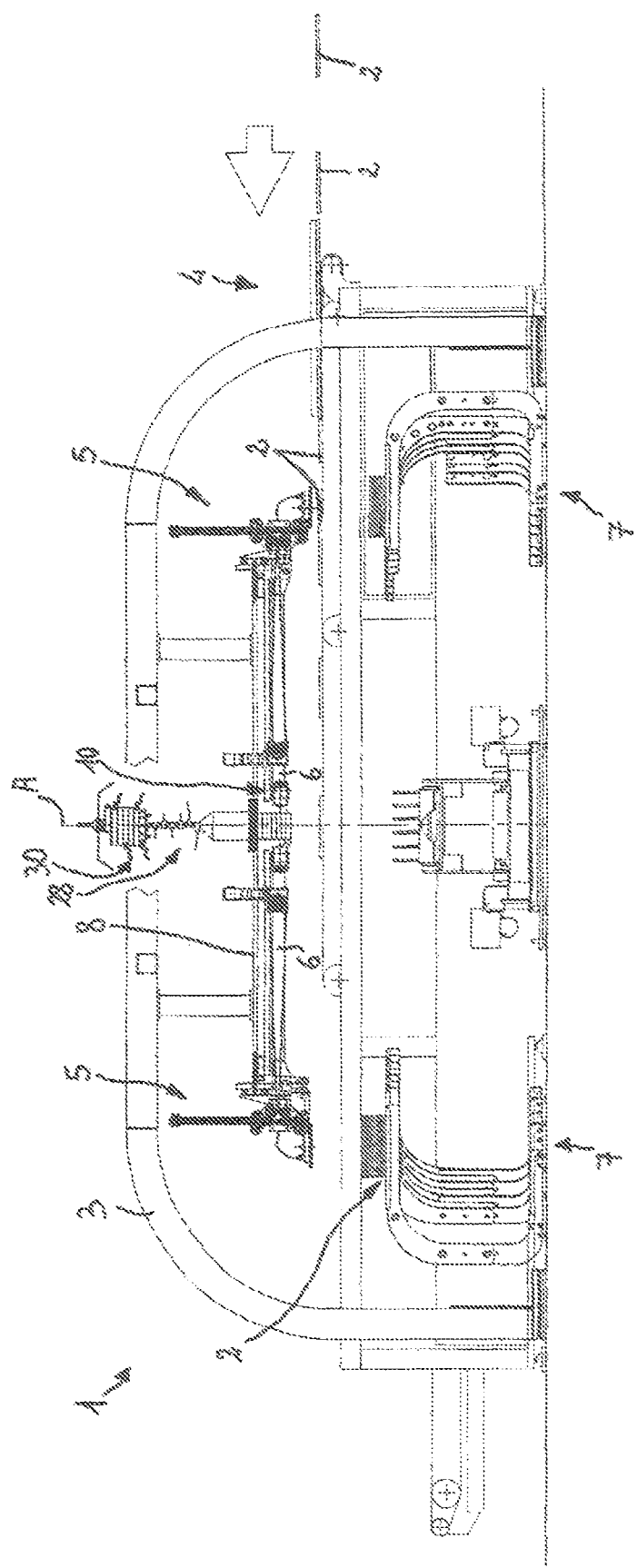
FIGS. 14, 15, 16 are respectively views of sections XIV-XIV, XV-XV, XVI-XVI of FIG. 13.

FIGS. 9-12 illustrate a second operating step of the sorting apparatus (1), wherein, contemporaneously: the first suction gripping unit (101) is moving towards the first seat (131) where it will release the first slab-shaped element (121), FIG. 12; the second suction gripping unit (102) has reached the inlet line (4) to pick up the second slab-shaped element (122); the third suction gripping unit (103) has released the third slab-shaped element (123) on the third seat (133); the fourth suction gripping unit (104) has released the fourth slab-shaped element (124) and is raising the suction cups (14, 350), FIG. 10; the fifth suction gripping unit (105) has released the fifth slab-shaped element (125) on the fifth seat (135) and is moving towards the inlet line (4), FIG. 11; the sixth suction gripping unit (106) has released the sixth slab-shaped element (126) on the sixth seat (136) and is moving towards the inlet line (4), see once more FIG. 11.

According to the second embodiment of FIGS. 13-16 each rotation-activating motor (10) of the plurality of rotation-activating motors (10) is borne by a rotating arm (6) of the plurality of rotating arms (6) and is arranged in proximity of the rotation axis of the arms (A) in order to limit the relative moment of inertia with respect to the same rotation axis of the arms (A).

The sorting apparatus (1) preferably comprises a fourth plurality of pulleys (34) (FIGS. 15, 16), a fifth plurality of pulleys (35) and a third plurality of transmissions (23); each pulley of the fourth plurality of pulleys (34) is solidly constrained to the drive shaft of an associated rotation-activating motor (10) of the plurality of rotation-activating motors (10) and engages with an associated transmission of the third plurality of transmissions (23); each pulley of the fifth plurality of pulleys (35) is solidly constrained to an associated pinion (9) of the plurality of pinions (9) and engages with an associated transmission of the third plurality of transmissions (23).

The functioning of the sorting apparatus (1) of this second embodiment is alike to that of the first embodiment, as described in the foregoing.

Each transmission of the first plurality of transmissions (21), of the second plurality of transmissions (22) of the third plurality of transmissions (23) is preferably a cogged chain.

In figures from 17 to 23 a possible further variant of the sorting system (1) of the present invention is illustrated, concerning the modalities with which the suction gripping units (5) and the seats (7) for receiving the slab-shaped articles (2) are realised, which enable a significant reduction of the times required for realising stacks of slab-shaped articles in the various seats and thus obtain a significant increase in terms of productivity.

In this particular and preferred embodiment, each suction gripping unit (5) of the plurality of suction gripping units (5) comprises: a depression source (13), at least a suction cup (14) connected to the depression source (13), and at least a linear actuator organ (51) which is configured to move the suction cup (14) vertically.

Figure 18:
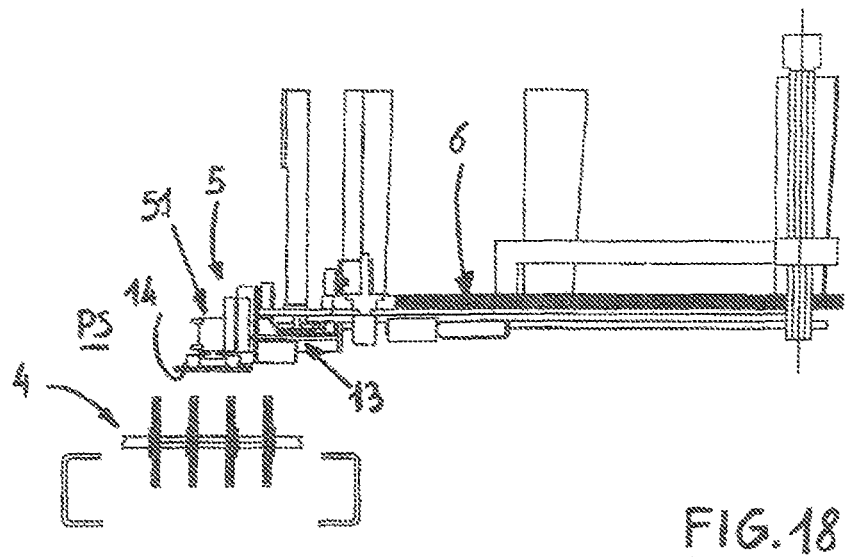
FIGS. 18 and 19 are partial schematic lateral views of a suction gripping unit according to the embodiment of FIG. 17 which is illustrated in two possible configurations.
Figure 19:
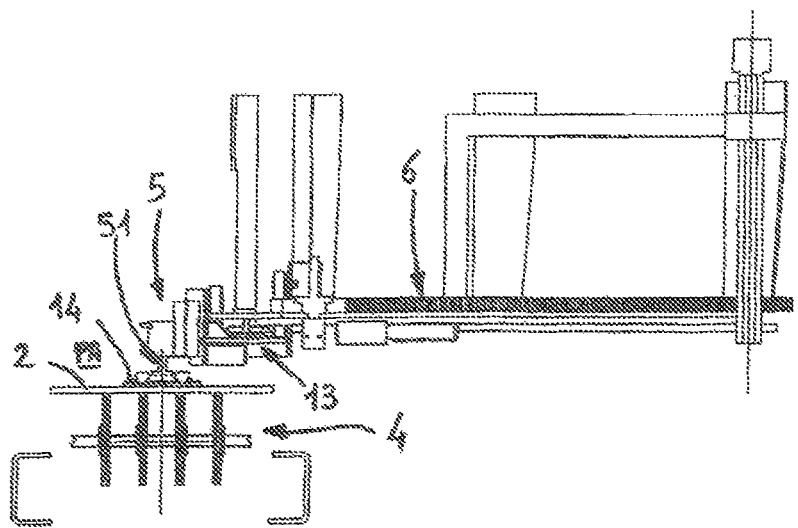

In particular, the linear actuator organ (51) is configured so as to move the suction cup (14) with a stroke of a predetermined entity, between a raised position (PS) (see for example FIG. 18) and a lowered position (PA) (see for example FIG. 19).

For example, the linear actuator organ (51) is preferably constituted by a pneumatic cylinder.

Thus, when each suction gripping unit (5) is positioned by the relative rotating arm (6) above the inlet line (4), the relative suction cup (14) can be moved and positioned by the linear actuator (51), in the lowered position (PA), to pick up by aspiration a slab-shaped article (2) from the inlet line (4) (FIG. 19) and, when moved and positioned by the linear actuator (51) in the raised position (PS), to pick up and retain by aspiration a slab-shaped article (2) from the inlet line (4).

Figure 20:
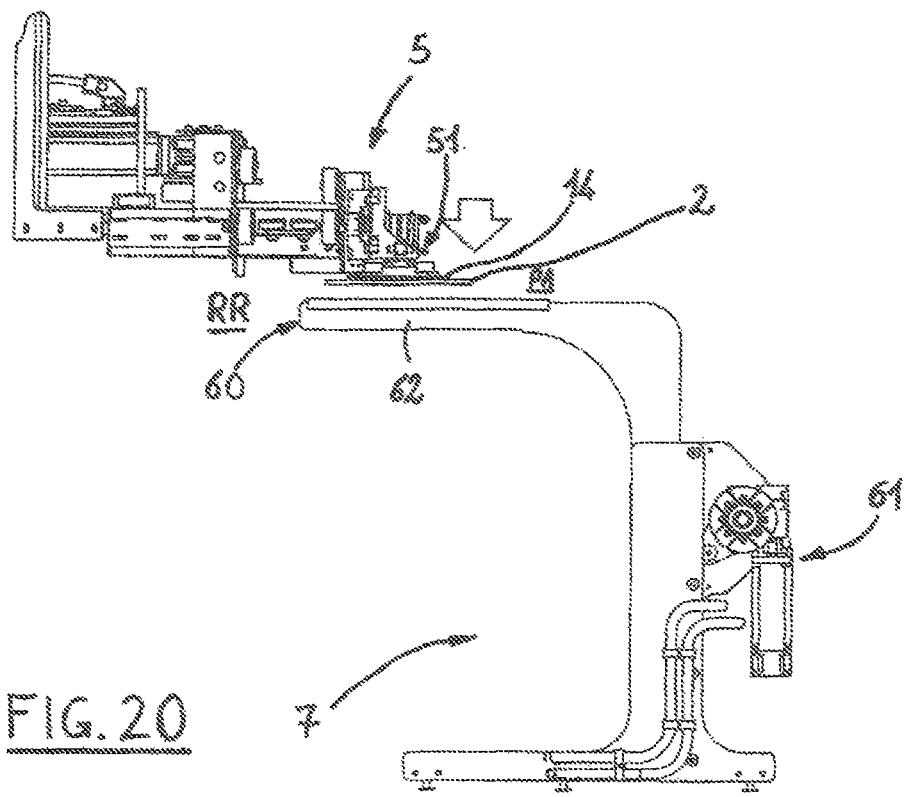
FIGS. 20, 21 and 22 illustrate, in respective schematic lateral views of a possible sequence of release of a slab-shaped article on a seat for receiving the slab-shaped elements and form a stack of slab-shaped articles according to the embodiment of FIG. 17.
Figure 21:
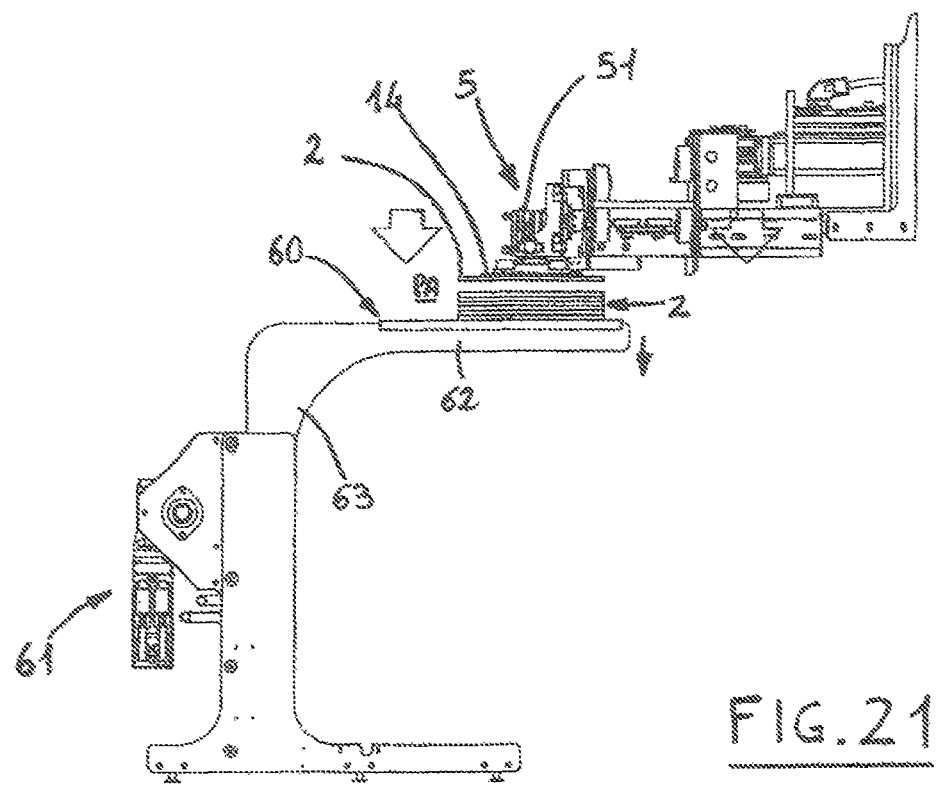

After the suction gripping unit (5) is positioned by the relative rotating arm (6) above a seat (7) of the plurality of seats (7), the suction cup (14) can be moved and positioned by the linear actuator (51) newly in the lowered position (PA), in order to be able to release the slab-shaped article (2) at a seat (7) (see for example FIGS. 20 and 21, which illustrate the movement of the suction cup (14) towards the seat (7) in order to release the slab-shaped article (2)).

Each seat (7) of the plurality of seats (7) is instead configured in such a way as to comprise a rest plane (60) and movement means (61) for vertically moving the rest plane (60).

The rest plane (60) preferably comprises a series of arms (62) parallel to one another and distanced and which are borne by a common support element (63).

Figure 22:
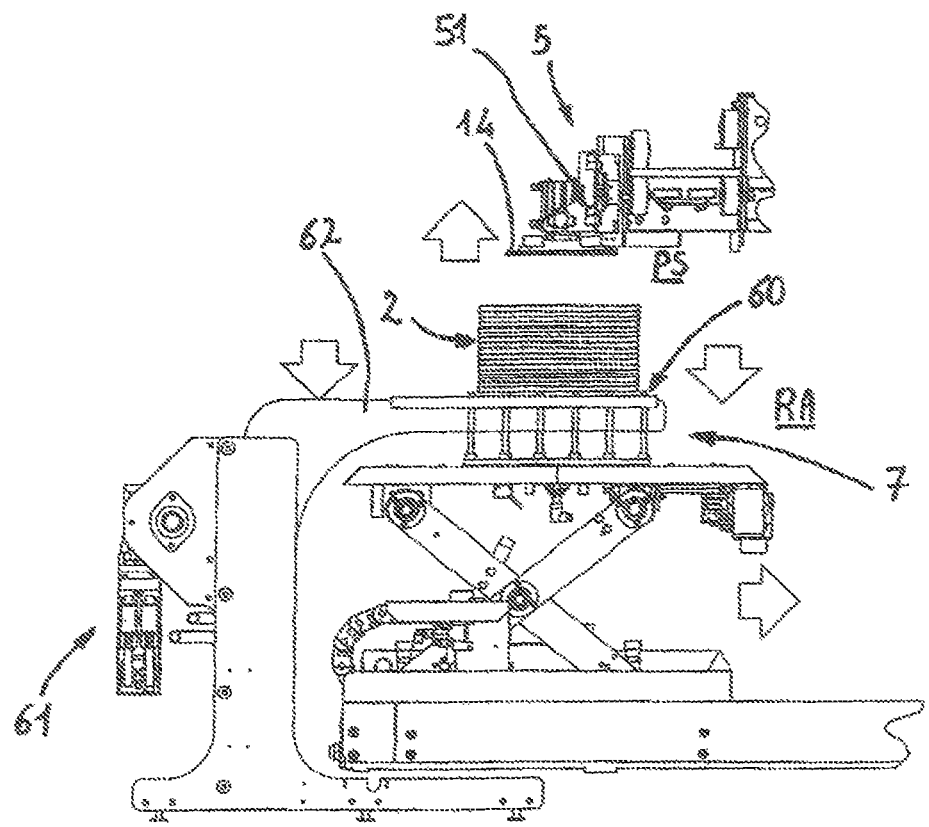

In particular, the movement means (61) are configured so as to vertically move the rest plane (60) in a series of stepped vertical displacements downwards, between an initial raised position (RR) (see for example FIG. 20) and a final lowered position (RA) (see for example FIG. 22).

In particular, the movement means (61) are realised and configured so as to vertically move the rest plane (60) downwards with a series of stepped vertical displacements in which each vertical displacement step is set so as to correspond to the thickness of the slab-shaped articles (2).

In this way, when the rest plane (60) is in the initial raised position (RR) (FIG. 20), a suction cup (14) of a suction gripping unit (5) can release, when moved and positioned in the relative lowered position (PA), a first slab-shaped article (2) onto the rest plane (60).

The seats (7) and the movement means (61) of the rest plane (60) are realised and configured in such a way that the initial raised position (RR) of the rest plane (60) is located at a height from the ground surface that is such as to enable release of the slab-shaped article (2) on the rest plane (60) when the suction cup (14) of the suction gripping unit (5), situated above the rest plane (60), is moved and positioned by the linear actuator organ (51) in the lowered position (PA).

And then, each time the rest plane (60) is moved by a step (corresponding to the thickness of the slab-shaped articles) vertically downwards, and towards the final lowered position (RA), the suction cup (14) of a following suction gripping unit (5) which is halted on the rest plane (60), when moved and positioned by the linear actuator (PA) in the relative lowered position (51), can release a following slab-shaped article (2) directly on the preceding slab-shaped article (2) in such a way as to form a stack of slab-shaped articles (2) on the rest plane (60) (see for example FIG. 21 which illustrates an intermediate step of forming a stack of slab-shaped articles (2), with the rest plane (60) in an intermediate position between the initial raised position (RR) and the final lowered position (RA), or FIG. 22 which instead illustrates the final step of formation of the stack with the rest plane (60) in the final lowered position (RA) and the suction cup (14) of the suction gripping unit (5) which, after having released the final slab-shaped article (2), is newly moved towards the relative raised position (PS)).

Owing to this particularity, the stroke that the suction cup (14) of each suction gripping unit (5) must carry out to release a slab-shaped article (2) at a seat (7) is always the same, set by the stroke of the linear actuator (51) (for example a pneumatic cylinder), while the rest plane (60) of the seats (7), time by time, might be moved in stepped fashion vertically downwards, by a step corresponding to the thickness of the slab-shaped articles (2), in order to move downwards the stack of slab-shaped articles (2) which is under formation and in such a way as to create sufficient space for the release of a following slab-shaped article (2).

The stepped downwards displacement of the rest plane (60) can take place in the waiting time prior to the arrival of a following suction gripping unit (5) above the seat (7).

Definitively, the time necessary to form a complete stack of slab-shaped articles at the various seats is very short, with a consequent improvement in productivity.

Figure 23:
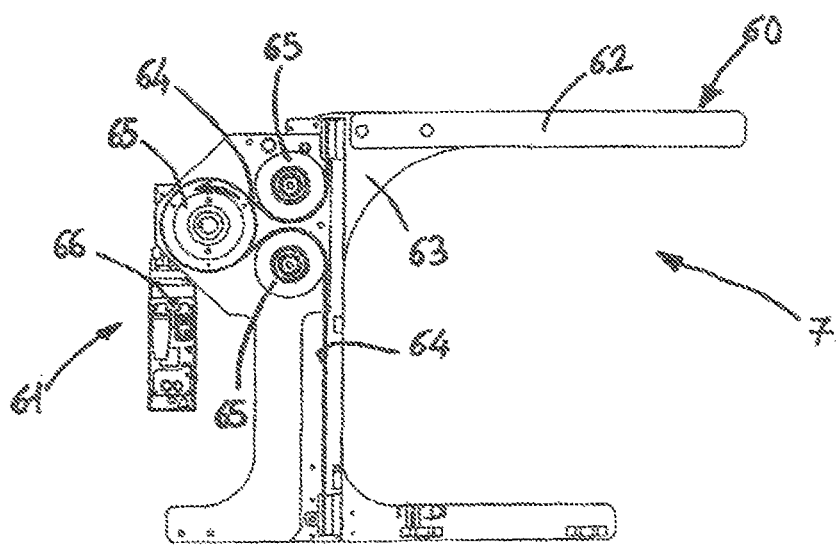
FIG. 23 is a partial schematic lateral view of a seat for receiving the slab-shaped articles and form a stack thereof with some parts that have been removed better to evidence some particular components.

As for example illustrated in FIG. 23, the movement means (61) of the rest plane (60) can preferably comprise an open chain (64) which is fixed, at a first end, at an upper fastening point to the support element (63) of the arms (62) of the rest plane (60), and, at a second end, at a lower fastening point, to the support element (63) of the arms (62) of the rest plane (60), drive transmission organs (65), such as for example pulleys or wheels, on which the chain (64) is wound, and a motor organ (66) (such as for example a brushless motor) for activating in rotation the drive transmission organs (65), in two opposite rotation directions, according to successive predetermined angular rotations.

In this way, for each angular rotation of the drive transmission organs (65) in a first rotation direction, the chain (64) can move the common support element (63) downwards, and then the arms (62) of the rest plane (60), by a step corresponding to the thickness of the slab-shaped articles.

Once the stack of slab-shaped articles has been formed on the rest plane (60) and extracted from the seat (7), the motor organ (66) can activate the drive transmission organs (65) so that via the chain (64), the rest plane (60) can be returned into the initial raised position (RR) ready to receive other slab-shaped articles.

It is understood that the foregoing has been described by way of non-limiting example, so that any constructional variants are understood to fall within the protective scope of the present technical solution, as claimed in the following.

The invention claimed is:

1. A sorting apparatus for sorting and stacking slab-shaped elements, comprising:
a frame;
an inlet line for infeeding slab-shaped elements to be sorted and stacked;
a plurality of suction gripping units for gripping slab-shaped elements;
a plurality of rotating arms which are rotatable with respect to a same rotation axis of the arms and which each bear a suction gripping unit of the plurality of suction gripping units;
a plurality of seats which are configured to receive the slab-shaped elements released by the plurality of suction gripping units, forming stacks of slab-shaped elements; and
a support crown which is solidly constrained to the frame;
wherein:
the rotation axis of the arms and the axis of the support crown coincide with one another;
the rotating arms of the plurality of rotating arms are mobile independently of one another;
the rotating arms of the plurality of rotating arms and the support crown are dimensioned with respect to one another in such a way that each rotating arm of the plurality of rotating arms is supported by the support crown at or in proximity of the relative free end; and
the sorting apparatus is configured in such a way that:
a first slab-shaped element coming from the inlet line can be gripped by a first suction gripping unit of the plurality of suction gripping units, rotated by a first rotating arm of the plurality of rotating arms which bears the first suction gripping unit and released by the first suction gripping unit on a first seat of the plurality of seats; and
contemporaneously, a second slab-shaped element coming from the inlet line and subsequent to the first slab-shaped element, can be gripped by a second suction gripping unit of the plurality of suction gripping units, rotated by a second rotating arm of the plurality of rotating arms which is contiguous to the first rotating arm and which bears the second suction gripping unit and released by the second suction gripping unit on a second seat of the plurality of seats,
wherein the seats of the plurality of seats are arranged externally of the support crown and wherein each suction gripping unit of the plurality of suction gripping units is arranged externally of the support crown,
further comprising a plurality of pinions and a plurality of rotation-activating motors, wherein: the support crown bears a circular cogging; each pinion of the plurality of pinions is borne rotatably by an associated rotating arm of the plurality of rotating arms and is arranged so as to enmesh with the circular cogging, so that on activation in rotation of the pinion there is a corresponding rotation of the rotating arm;
and each rotation-activating motor of the plurality of rotation-activating motors is arranged so as to activate in rotation an associated pinion of the plurality of pinions.

2. The sorting apparatus of claim 1, wherein the ends of the rotating arms of the plurality of rotating arms which are at the rotation axis of the arms are: arranged at different heights to one another, and conformed in such a way as not to obstruct one another so that it is possible to minimise the angular distance attainable between two contiguous rotating arms of the plurality of rotating arms.

3. The sorting apparatus of claim 1, wherein each suction gripping unit of the plurality of suction gripping units comprises: a depression source; at least a first suction cup connected to the depression source; a suction cup support which bears the first suction cup, which is movable to be raised and lowered so that the first suction cup can pick up a slab-shaped element from the inlet line and can release the slab-shaped element on a seat of the plurality of seats; and a raising motor for raising the suction cup support.

4. The sorting apparatus of claim 1, further comprising a plurality of connecting shafts which are coaxial to the rotation axis of the arms and which are inserted one inside another with freedom to rotate independently of one another, also comprising a first plurality of transmissions and a second plurality of transmissions, wherein: each rotation-activating motor of the plurality of rotation-activating motors is borne by the frame; each transmission of the first plurality of transmissions connects the drive shaft of an associated rotation-activating motor of the plurality of rotation-activating motors with an associated connecting shaft of the plurality of connecting shafts; each transmission of the second plurality of transmissions connects an associated connecting shaft of the plurality of connecting shafts with a pinion of the plurality of pinions; and the sorting apparatus is configured in such a way that each rotation-activating motor of the plurality of rotation-activating motors can activate in rotation an associated rotating arm of the plurality of rotating arms via an associated transmission of the first plurality of transmissions, an associated connecting shaft of the plurality of connecting shafts, an associated transmission of the second plurality of transmissions and an associated pinion of the plurality of pinions.

5. The sorting apparatus of claim 4, further comprising a first plurality of pulleys wherein each pulley of the first plurality of pulleys is solidly constrained to the drive shaft of an associated rotation-activating motor of the plurality of rotation-activating motors and engages with an associated transmission of the first plurality of transmissions.

6. The sorting apparatus of claim 4, further comprising a second plurality of pulleys wherein each pulley of the second plurality of pulleys is solidly constrained to an associated pinion of the plurality of pinions and engages with an associated transmission of the second plurality of transmissions.

7. The sorting apparatus of claim 4, further comprising a third plurality of pulleys, wherein: the plurality of connecting shafts comprises a primary connecting shaft and a first tubular connecting shaft; the third plurality of pulleys comprises: a first pulley which is solidly connected to the primary connecting shaft and which engages with a first transmission of the first plurality of transmissions; and a second pulley that is solidly connected to the primary connecting shaft and engages with a second transmission of the second plurality of transmissions; the primary connecting shaft is arranged internally of the first tubular connecting shaft and exits from a first end of the first tubular connecting shaft with the first pulley and from a second end of the first tubular connecting shaft with the second pulley; the third plurality of pulleys further comprises: a third pulley which is solidly connected to the first tubular connecting shaft, which is interposed between the first pulley and the second pulley, and which engages with a third transmission of the first plurality of transmissions; and a fourth pulley which is solidly connected to the first tubular connecting shaft, which is interposed between the first pulley and the second pulley, and which engages with a fourth transmission of the second plurality of transmissions.

8. The sorting apparatus of claim 7, wherein: the plurality of connecting shafts comprises a second tubular connecting shaft; the first tubular connecting shaft is arranged internally of the second tubular connecting shaft and exits from a first end of the second tubular connecting shaft with the third pulley and from a second end of the second tubular connecting shaft with the fourth pulley; the third plurality of pulleys further comprises: a fifth pulley which is solidly connected to the second tubular connecting shaft, which is interposed between the third pulley and the fourth pulley and which engages with a fifth transmission of the first plurality of transmissions; and a sixth pulley which is solidly connected to the second tubular connecting shaft, which is interposed between the third pulley and the fourth pulley, and which engages with a sixth transmission of the second plurality of transmissions.

9. The sorting apparatus of claim 8, wherein: the plurality of connecting shafts comprises a third tubular connecting shaft; the second tubular connecting shaft is arranged internally of the third tubular connecting shaft and exits from a first end of the third tubular connecting shaft with the fifth pulley and from a second end of the third tubular connecting shaft with the sixth pulley; the third plurality of pulleys further comprises: a seventh pulley which is solidly connected to the third tubular connecting shaft, which is interposed between the fifth pulley and the sixth pulley, and which engages with a seventh transmission of the first plurality of transmissions; and a eighth pulley which is solidly connected to the third tubular connecting shaft, which is interposed between the fifth pulley and the sixth pulley, and which engages with an eighth transmission of the second plurality of transmissions.

10. The sorting apparatus of claim 9, wherein: the plurality of connecting shafts comprises a fourth tubular connecting shaft; the third tubular connecting shaft is arranged internally of the fourth tubular connecting shaft and exits from a first end of the fourth tubular connecting shaft with the seventh pulley and from a second end of the fourth tubular connecting shaft with the eighth pulley; the third plurality of pulleys further comprises: a ninth pulley which is solidly connected to the fourth tubular connecting shaft, which is interposed between the seventh pulley and the eighth pulley, and which engages with a ninth transmission of the first plurality of transmissions; and a tenth pulley which is solidly connected to the fourth tubular connecting shaft, which is interposed between the seventh pulley and the eighth pulley, and which engages with a tenth transmission of the second plurality of transmissions.

11. The sorting apparatus of claim 1, wherein each rotation-activating motor of the plurality of rotation-activating motors is borne by a rotating arm of the plurality of rotating arms and is arranged in proximity of the rotation axis of the arms in order to limit the relative moment of inertia with respect to the same rotation axis of the arms.

12. The sorting apparatus of claim 11, further comprising a fourth plurality of pulleys and a third plurality of transmissions, wherein each pulley of the fourth plurality of pulleys is solidly constrained to the drive shaft of an associated rotation-activating motor of the plurality of rotation-activating motors and engages with an associated transmission of the third plurality of transmissions, further comprising a fifth plurality of pulleys, each pulley of the fifth plurality of pulleys being solidly constrained to an associated pinion of the plurality of pinions and engaging with an associated transmission of the third plurality of transmissions.

13. A sorting apparatus for sorting and stacking slab-shaped elements, comprising:
 a frame;
 an inlet line for infeeding slab-shaped elements to be sorted and stacked;
 a plurality of suction gripping units for gripping slab-shaped elements;
 a plurality of rotating arms which are rotatable with respect to a same rotation axis of the arms and which each bear a suction gripping unit of the plurality of suction gripping units;
 a plurality of seats which are configured to receive the slab-shaped elements released by the plurality of suction gripping units, forming stacks of slab-shaped elements; and
 a support crown which is solidly constrained to the frame; wherein:

the rotation axis of the arms and the axis of the support crown coincide with one another;

the rotating arms of the plurality of rotating arms are mobile independently of one another;

the rotating arms of the plurality of rotating arms and the support crown are dimensioned with respect to one another in such a way that each rotating arm of the plurality of rotating arms is supported by the support crown at or in proximity of the relative free end; and the sorting apparatus is configured in such a way that:

a first slab-shaped element coming from the inlet line can be gripped by a first suction gripping unit of the plurality of suction gripping units, rotated by a first rotating arm of the plurality of rotating arms which bears the first suction gripping unit and released by the first suction gripping unit on a first seat of the plurality of seats; and contemporaneously, a second slab-shaped element coming from the inlet line and subsequent to the first slab-shaped element, can be gripped by a second suction gripping unit of the plurality of suction gripping units, rotated by a second rotating arm of the plurality of rotating arms which is contiguous to the first rotating arm and which bears the second suction gripping unit, and released by the second suction gripping unit on a second seat of the plurality of seats, wherein each suction gripping unit of the plurality of suction gripping units comprises:

a depression source, at least a suction cup connected to the depression source, and at least a linear actuator organ which is configured to move the suction cup with a stroke having a prefixed entity between a raised position and a lowered position so that the suction cup, when positioned in the lowered position, can pick up by aspiration a slab-shaped article from the inlet line and, when positioned in the raised position, can pick up and retain by aspiration a slab-shaped article from the inlet line and then, when newly positioned in the lowered position, can release the slab-shaped article at a seat of the plurality of seats, and wherein each seat of the plurality of seats is configured in such a way as to comprise a rest plane and movement means for vertically moving the rest plane in a series of stepped vertical displacements downwards between an initial raised position and a final lowered position so that, when the rest plane is in the initial raised position, the suction cup of a suction gripping unit can release a slab-shaped article onto the rest plane, when it is moved and positioned in the relative lowered position, and then, each time the rest plane is moved by a step vertically downwards, and towards the final the final lowered position, a suction cup of a following suction gripping unit, when positioned in the relative lowered position, it can release a following slab-shaped article on the preceding slab-shaped article in such a way as to form a stack of slab-shaped articles on the rest plane.

14. A sorting apparatus for sorting and stacking slab-shaped elements, comprising:

a frame;

an inlet line for infeeding slab-shaped elements to be sorted and stacked;

a plurality of suction gripping units for gripping slab-shaped elements;

a plurality of rotating arms which are rotatable with respect to a same rotation axis of the arms and which each bear a suction gripping unit of the plurality of suction gripping units;

a plurality of seats which are configured to receive the slab-shaped elements released by the plurality of suction gripping units, forming stacks of slab-shaped elements; and a support crown which is solidly constrained to the frame; wherein:

the rotation axis of the arms and the axis of the support crown coincide with one another;

the rotating arms of the plurality of rotating arms are mobile independently of one another;

the rotating arms of the plurality of rotating arms and the support crown are dimensioned with respect to one another in such a way that each rotating arm of the plurality of rotating arms is supported by the support crown at or in proximity of the relative free end; and the sorting apparatus is configured in such a way that:

a first slab-shaped element coming from the inlet line can be gripped by a first suction gripping unit of the plurality of suction gripping units, rotated by a first rotating arm of the plurality of rotating arms which bears the first suction gripping unit and released by the first suction gripping unit on a first seat of the plurality of seats; and contemporaneously, a second slab-shaped element coming from the inlet line and subsequent to the first slab-shaped element, can be gripped by a second suction gripping unit of the plurality of suction gripping units, rotated by a second rotating arm of the plurality of rotating arms which is contiguous to the first rotating arm and which bears the second suction gripping unit, and released by the second suction gripping unit on a second seat of the plurality of seats, further comprising a plurality of wheels, wherein: each rotating arm of the plurality of rotating arms bears: a first wheel of the plurality of wheels which is arranged at or in proximity of the relative free end in order to abut the support crown and in order to roll on the upper side of the support crown; and a second wheel of the plurality of wheels which is arranged at or in proximity of the relative free end so as to abut the support crown and to roll on the lower side of the support crown, so that the rotating arm is constrained to slide along the support crown.

* * * * *